United States Patent
Kang et al.

(10) Patent No.: US 12,430,064 B2
(45) Date of Patent: Sep. 30, 2025

(54) MEMORY CONTROLLER, OPERATION METHOD THEREOF, AND MEMORY SYSTEM

(71) Applicant: SAMSUNG ELECTRONICS CO., LTD., Suwon-si (KR)

(72) Inventors: Soonyoung Kang, Suwon-si (KR); Dongmin Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/737,403

(22) Filed: Jun. 7, 2024

(65) Prior Publication Data
US 2024/0427520 A1    Dec. 26, 2024

(30) Foreign Application Priority Data

Jun. 21, 2023  (KR) .................. 10-2023-0079935
Sep. 18, 2023  (KR) .................. 10-2023-0124276

(51) Int. Cl.
*G06F 3/06* (2006.01)

(52) U.S. Cl.
CPC .......... *G06F 3/0655* (2013.01); *G06F 3/0608* (2013.01); *G06F 3/0679* (2013.01)

(58) Field of Classification Search
CPC .... G06F 3/0608; G06F 3/0655; G06F 3/0679; G06F 3/019; G06F 3/0629; G06F 3/0659
USPC ................................ 711/154, 103
See application file for complete search history.

(56) References Cited

U.S. PATENT DOCUMENTS

| | | | |
|---|---|---|---|
| 9,575,833 B2 | 2/2017 | Jeon | |
| 11,456,758 B1 | 9/2022 | Zamir et al. | |
| 11,799,497 B2 | 10/2023 | Lee et al. | |
| 12,032,851 B2* | 7/2024 | Sohn .................. | G06F 3/0655 |
| 2022/0164143 A1 | 5/2022 | Kim et al. | |
| 2023/0164143 A1* | 5/2023 | Richardson, IV .. | H04L 63/0876 726/6 |
| 2023/0402071 A1* | 12/2023 | Park .................. | G11C 11/5671 |
| 2024/0079073 A1 | 3/2024 | Kil et al. | |

FOREIGN PATENT DOCUMENTS

| | | |
|---|---|---|
| KR | 10-1711056 | 2/2017 |
| KR | 10-2265220 | 6/2021 |
| KR | 10-2345067 | 12/2021 |

(Continued)

*Primary Examiner* — Hashem Farrokh
(74) *Attorney, Agent, or Firm* — Fish & Richardson P.C.

(57) ABSTRACT

An example memory system includes a memory device and a memory controller. The memory device is configured to read, from a memory cell array, hard decision data based on a hard read voltage and first soft decision data based on first soft read voltages obtained based on the hard read voltage and a first voltage offset, generate a first compressed sub-segment based on encoding a position of a bit having a first value into a position value for each of first soft decision sub-segments in the first soft decision data, and output first compressed data including first compressed sub-segments. The memory controller is configured to receive the first compressed data, count the number of position values in each of the first compressed sub-segments, and provide, to the memory device based on the counted number, a command to request a change of a voltage offset and a recompression operation.

20 Claims, 32 Drawing Sheets

(56) References Cited

FOREIGN PATENT DOCUMENTS

| KR | 10-2022-0072398 | 6/2022 |
| KR | 10-2023-0049537 | 4/2023 |
| KR | 10-2024-0033792 | 3/2024 |

* cited by examiner

FIG. 15

| DQ<br>B | <0> | <1> | <2> | <3> | <4> | <5> | <6> | <7> |
|---|---|---|---|---|---|---|---|---|
| 1st | 0x00 | 0x01 | 0x02 | 0x03 | 0x04 | 0x05 | 0x06 | 0x07 |
| 2nd | 0x08 | 0x09 | 0x0A | 0x0B | 0x0C | 0x0D | 0x0E | 0x0F |
| 3rd | 0x10 | 0x11 | 0x12 | 0x13 | 0x14 | 0x15 | 0x16 | 0x17 |
| 4th | 0x18 | 0x19 | 0x1A | 0x1B | 0x1C | 0x1D | 0x1E | 0x1F |
| 5th | 0x20 | 0x21 | 0x22 | 0x23 | 0x24 | 0x25 | 0x26 | 0x27 |
| 6th | 0x28 | 0x29 | 0x2A | 0x2B | 0x2C | 0x2D | 0x2E | 0x2F |
| 7th | 0x30 | 0x31 | 0x32 | 0x33 | 0x34 | 0x35 | 0x36 | 0x37 |
| 8th | 0x38 | 0x39 | 0x3A | 0x3B | 0x3C | 0x3D | 0x3E | 0x3F |
| 9th | 0x40 | 0x41 | 0x42 | 0x43 | 0x44 | 0x45 | 0x46 | 0x47 |
| 10th | 0x48 | 0x49 | 0x4A | 0x4B | 0x4C | 0x4D | 0x4E | 0x4F |
| 11th | 0x50 | 0x51 | 0x52 | 0x53 | 0x54 | 0x55 | 0x56 | 0x57 |
| 12th | 0x58 | 0x59 | 0x5A | 0x5B | 0x5C | 0x5D | 0x5E | 0x5F |
| 13th | 0x60 | 0x61 | 0x62 | 0x63 | 0x64 | 0x65 | 0x66 | 0x67 |
| 14th | 0x68 | 0x69 | 0x6A | 0x6B | 0x6C | 0x6D | 0x6E | 0x6F |
| 15th | 0x70 | 0x71 | 0x72 | 0x73 | 0x74 | 0x75 | 0x76 | 0x77 |
| 16th | 0x78 | 0x79 | 0x7A | 0x7B | 0x7C | 0x7D | 0x7E | 0x7F |

Location mapping table

FIG. 21A

| HD | SD | LLR |
|----|----|-----|
| 1  | 0  | −3  |
| 1  | 1  | −1  |
| 0  | 1  | +1  |
| 0  | 0  | +3  |

LLR mapping table

MEMORY CONTROLLER, OPERATION METHOD THEREOF, AND MEMORY SYSTEM

CROSS-REFERENCE TO RELATED APPLICATIONS

This application claims priority under 35 U.S.C. § 119 to Korean Patent Application No. 10-2023-0079935, filed on Jun. 21, 2023, and Korean Patent Application No. 10-2023-0124276, filed on Sep. 18, 2023, in the Korean Intellectual Property Office, the disclosures of which are incorporated by reference herein in their entirety.

BACKGROUND

Non-volatile memory devices read hard decision data based on hard decision voltages and generate soft decision data by using read values that are read based on a plurality of soft read voltages.

Soft decision data are information indicating the reliability of hard decision data. Memory controllers perform error correction operations based on hard decision data and soft decision data.

SUMMARY

The present disclosure relates to a memory system configured to correct an error based on soft decision data, a memory controller configured to determine the compression quality of soft decision data, and a method of operating the memory controller.

In general, according to some aspects, a memory system includes a memory device configured to read hard decision data from a memory cell array by using a hard read voltage, read first soft decision data from the memory cell array by using two or more first soft read voltages determined based on the hard read voltage and a first voltage offset, generate a first compressed segment by encoding a position of a bit having a first value into a position value, for each of a plurality of first soft decision sub-segments that are included in the first soft decision data, and output first compressed data including a plurality of first compressed segments, and a memory controller configured to receive the first compressed data, count the number of position values in each of the plurality of first compressed segments, and provide, to the memory device, a command to request a change of a voltage offset and a recompression operation, based on the counted number.

In general, according to some aspects, a method of operating a memory controller includes providing a read command to a memory device, receiving, from the memory device, hard decision data that is read based on a hard read voltage, receiving first compressed data including a plurality of first compressed sub-segments that respectively correspond to a plurality of first soft decision sub-segments, which are included in first soft decision data that is read based on first soft read voltages determined by the hard read voltage and a voltage offset, providing, to the memory device, a command to request a change of the voltage offset, based on the number of position values of bits each having a first value in each of the plurality of first soft decision sub-segments, the position values being included in each of the plurality of first compressed sub-segments, receiving, from the memory device, second compressed data of second soft decision data that is read based on second soft read voltages determined by the hard read voltage and the changed voltage offset, obtaining the second soft decision data by performing a decompression operation on the second compressed data, and performing error correction on the hard decision data, based on the second soft decision data.

In general, according to some aspects, a memory controller includes a memory interface configured to receive, from a memory device, hard decision data, which is read based on a hard read voltage, and first compressed data including a plurality of first compressed sub-segments that respectively correspond to a plurality of first soft decision sub-segments of first soft decision data, the first soft decision data being read based on first soft read voltages determined by the hard read voltage and a voltage offset, and an error correction circuit configured to output a signal for requesting a change of the voltage offset, based on the number of position values of bits each having a first value in each of the plurality of first soft decision sub-segments, the position values being included in each of the plurality of first compressed sub-segments.

BRIEF DESCRIPTION OF THE DRAWINGS

Implementations will be more clearly understood from the following detailed description taken in conjunction with the accompanying drawings.

FIG. 15 is a diagram illustrating an example of a position mapping table.

FIGS. 21A and 21B are example diagrams illustrating log-likelihood ratio (LLR) adjustment.

DETAILED DESCRIPTION

Hereinafter, various implementations of the present disclosure will be described in detail with reference to the accompanying drawings.

Figure 1:
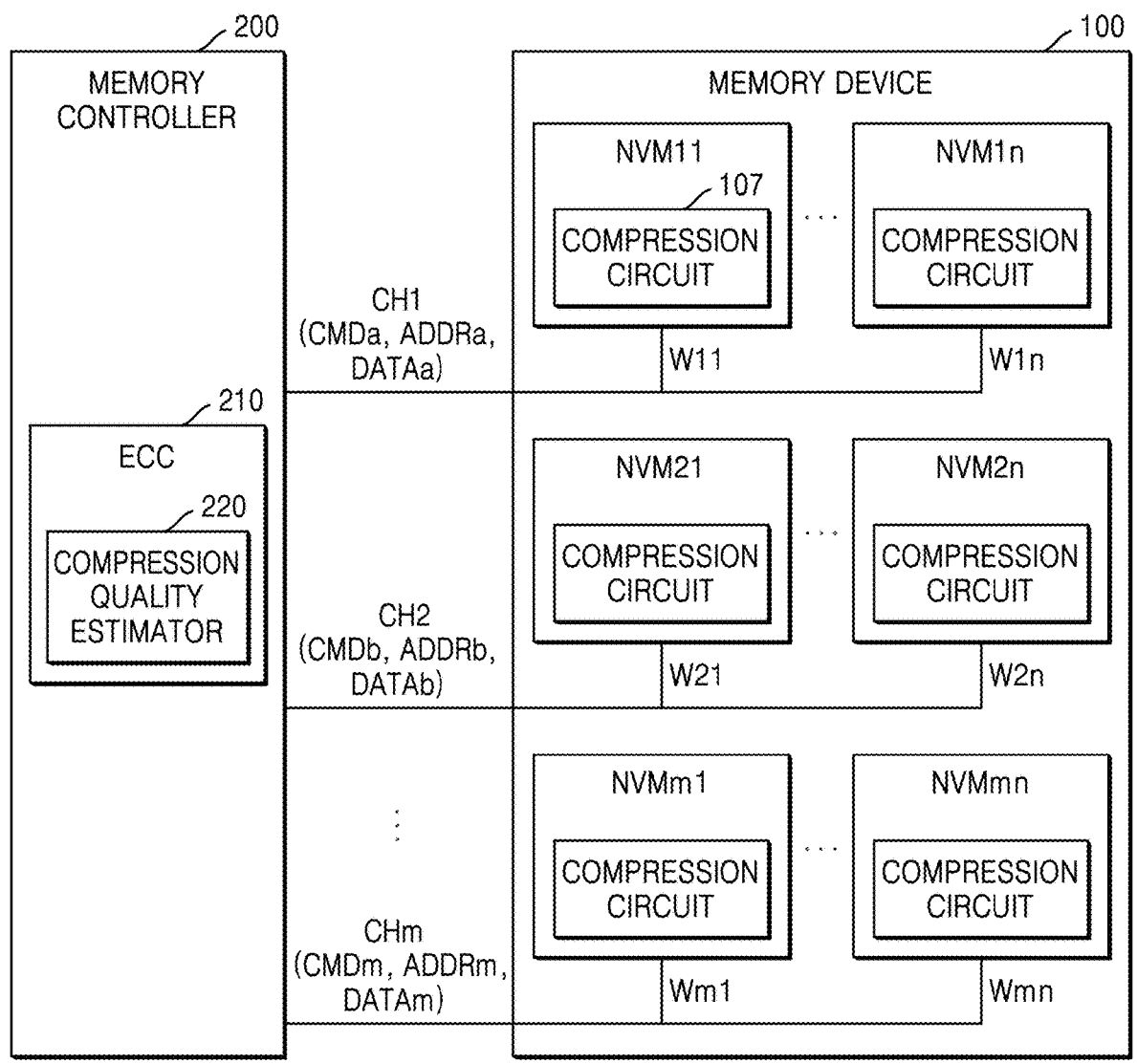
FIG. 1 is a block diagram of an example of a memory system.

FIG. 1 is a block diagram of an example of a memory system 1.

Referring to FIG. 1, the memory system 1 may include a memory device 100 and a memory controller 200. The memory system 1 may support a plurality of channels CH1 to CHm, and the memory device 100 may be connected to the memory controller 200 through the plurality of channels CH1 to CHm. For example, the memory system 1 may be implemented as a storage device, such as an SSD.

The memory device 100 may include a plurality of NVM devices NVM11 to NVMmn.

Each of the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In some implementations, each of the NVM devices NVM11 to NVMmn may be implemented as an arbitrary memory unit that may operate according to an individual command from the memory controller 200. For example, each of the NVM devices NVM11 to NVMmn may be implemented as a chip or a die, but the present disclosure is not limited thereto.

The memory controller 200 may transmit and receive signals to and from the memory device 100 through the plurality of channels CH1 to CHm. For example, the memory controller 200 may transmit commands CMDa to CMDm, addresses ADDRa to ADDRm, and data DATAa to DATAm to the memory device 100 through the channels CH1 to CHm or receive the data DATAa to DATAm from the memory device 100.

The memory controller 200 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 200 may select the NVM device NVM11 from the NVM devices NVM11 to NVM1n connected to the first channel CH1. The memory controller 200 may transmit the command CMDa, the address ADDRa, and the data DATAa to the selected NVM device NVM11 through the first channel CH1 or receive the data DATAa from the selected NVM device NVM11.

The memory controller 200 may transmit and receive signals to and from the memory device 100 in parallel through different channels. For example, the memory controller 200 may transmit a command CMDb to the memory device 100 through the second channel CH2 while transmitting a command CMDa to the memory device 100 through the first channel CH1. For example, the memory controller 200 may receive data DATAb from the memory device 100 through the second channel CH2 while receiving data DATAa from the memory device 100 through the first channel CH1.

The memory controller 200 may control all operations of the memory device 100. The memory controller 200 may transmit a signal to the channels CH1 to CHm and control each of the NVM devices NVM11 to NVMmn connected to the channels CH1 to CHm. For instance, the memory controller 200 may transmit the command CMDa and the address ADDRa to the first channel CH1 and control one selected from the NVM devices NVM11 to NVM1n.

Each of the NVM devices NVM11 to NVMmn may operate via the control of the memory controller 200. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 200.

Although FIG. 1 illustrates an example in which the memory device 100 communicates with the memory controller 200 through m channels and includes n NVM devices corresponding to each of the channels, the number of channels and the number of NVM devices connected to one channel may be variously changed.

An error correction code (ECC) circuit 210 for correcting errors in data read from the memory device 100 may be arranged in the memory controller 200. An error correction method of the ECC circuit 210 may include a hard decision method and a soft decision method.

The hard decision method may be a method of correcting errors in data by using ECCs and data (hereinafter, referred to as hard decision data) that is read depending on On/Off characteristics of a memory cell when a certain reference voltage (hereinafter, referred to as a hard read voltage) is applied to the memory cell. For example, errors in hard decision data may be corrected based on a parity check matrix and the hard decision data.

The soft decision method may be a method of correcting errors in data by additionally using additional information (hereinafter, soft decision data) about the reliability of hard decision data, separately from the hard decision data and ECCs. The soft decision data may refer to data read depending on On/Off characteristics of a memory cell when voltages (hereinafter, referred to as soft read voltages) obtained by adding certain voltage offsets to or subtracting the certain voltage offsets from a hard read voltage are applied to the memory cell.

The memory controller 200 may provide a read command for hard decision data and soft decision data to the memory device 100. The memory device 100 may provide, to the memory controller 200, hard decision data obtained from an NVM device selected from the NVM devices NVM11 to NVMmn. Each of the NVM devices NVM11 to NVMmn may include a compression circuit (for example, 107 in FIG. 2) and the compression circuit 107 may compress the soft decision data. The compression circuit 107 may compress the soft decision data obtained from the selected NVM device, and the compressed data may be provided to the memory controller 200.

The ECC circuit 210 may generate the soft decision data by decompressing the compressed data and may correct errors in the hard decision data, based on the hard decision data and the soft decision data. For example, the ECC circuit 210 may correct the hard decision data by calculating a log-likelihood ratio (LLR) based on the soft decision data, but implementations of the present disclosure are not limited thereto.

In some implementations, the soft decision data may indicate an overlap region between adjacent threshold voltage distributions by "1" and the other region by "0". The overlap region between the threshold voltage distributions may be a region in which the reliability of the hard decision data is relatively low. The other region may be a region in which the reliability of the hard decision data is relatively high. Because the overlap region between the adjacent threshold voltage distributions is smaller than the other region, the number of "1"s in the soft decision data may be less than the number of "0"s in the soft decision data. For convenience of description, it is described that "1" in the soft decision data indicates the overlap region between the threshold voltage distributions and "0" in the soft decision data indicates the other region, but implementations of the present disclosure are not limited thereto. For example, the soft decision data may represent the overlap region between the threshold voltage distributions by "0" and represent the other region by "1".

The compression circuit 107, which is included in each of the NVM devices NVM11 to NVMmn, may generate compressed data by encoding "1" in the soft decision data into a position value for "1".

NVM devices sharing the same channel may perform the output of the hard decision data and the compression of the soft decision data in parallel. For example, while some of the NVM devices NVM11 to NVM1*n* sharing the first channel CH1 provide the hard decision data to the memory controller 200 through the first channel CH1, some other NVM devices may compress the soft decision data. When the output of the hard decision data is completed, some other NVM devices may provide the compressed data to the memory controller 200 through the first channel CH1. Because the compression of the soft decision data and the output of the hard decision data are performed in parallel and the compressed data is output when the output of the hard decision data is finished, the lead time for providing the hard decision data and the soft decision data to the memory controller 200 may be reduced.

The compression circuit 107 may generate the compressed data including the position value for "1" by encoding the position value for "1" that is included in the soft decision data. The compression circuit 107 may generate the compressed data with a fixed size regardless of the number of "1"s in the soft decision data.

The compression circuit 107 may compress the soft decision data by unit size (for example, 128 bits). The soft decision data with a unit size may be referred to as a soft decision sub-segment. The compression circuit 107 may compress the soft decision sub-segment and thus generate a compressed sub-segment. The compressed sub-segment may include position values for "1"s that are included in the soft decision sub-segment. The position value for each "1" may be represented by 8 bits.

The compression circuit 107 may generate a compressed sub-segment with a fixed size (for example, 32 bits), regardless of the number of "1"s in the soft decision sub-segment. For example, when the number of "1"s in the soft decision sub-segment is less than a reference number (for example, 4), the compression circuit 107 may generate a compressed sub-segment with a fixed size by including a dummy value in the compressed sub-segment. When the number of "1"s in the soft decision sub-segment is greater than the reference number (for example, 4), the compression circuit 107 may generate a compressed sub-segment with a fixed size by excluding position values for "1"s as many as an excess number above the reference number from the compressed sub-segment. Therefore, the position values for "1"s may be lost.

In some implementations, the compression circuit 107 may generate a compressed sub-segment with a varying size depending on the number of "1"s in the soft decision sub-segment. For example, when the soft decision sub-segment includes N "1"s (where N is a natural number), the compression circuit 107 may generate a compressed sub-segment including N position values by representing each position value for "1" by 8 bits. That is, the compression circuit 107 may generate compressed data by encoding the position values for "1"s, which are included in the soft decision data, without loss. The memory controller 200 may receive the compressed data and may obtain the soft decision data with no loss in the number of "1"s by decoding the compressed data.

In each soft decision sub-segment, "1"s as many as an excess number above the reference number may be lost. Therefore, when the compressed data is decompressed, the ECC circuit 210 may obtain the soft decision data having lost some of "1"s. However, due to the nature of error correction methods, despite the loss of some bits in the soft decision data, the ECC circuit 210 may perform error correction on the hard decision data by using that soft decision data. For example, the ECC circuit 210 may calculate an LLR by using the soft decision data and may perform error correction on the hard decision data by using a low density parity check (LDPC) method based on the LLR.

In some implementations, a compression quality estimator 220 may estimate the compression quality of the compressed data. As there are a larger number of position values in the compressed sub-segment, there may be higher possibility of the loss of some of the position values respectively indicating "1"s in the soft decision sub-segments. The compression quality estimator 220 may count the number of compressed sub-segments, which each include more position values in number than a first reference number, from among a plurality of compressed sub-segments. For example, the compression quality estimator 220 may count the number of compressed sub-segments each including 4 position values. The compression quality estimator 220 may determine that the compression quality is bad when the counted number is a second reference value or more. When the compression quality is bad, the memory controller 200 may request the memory device 100 to change a voltage offset for reading the soft decision data, to use the changed voltage offset and to provide the compressed data again. When the counted number is less than the second reference value, the compression quality estimator 220 may determine that the compression quality is good. When the compression quality is good, the ECC circuit 210 may perform decompression on the compressed data and may perform an ECC operation on the hard decision data, based on the soft decision data that is decompressed.

Figure 2:
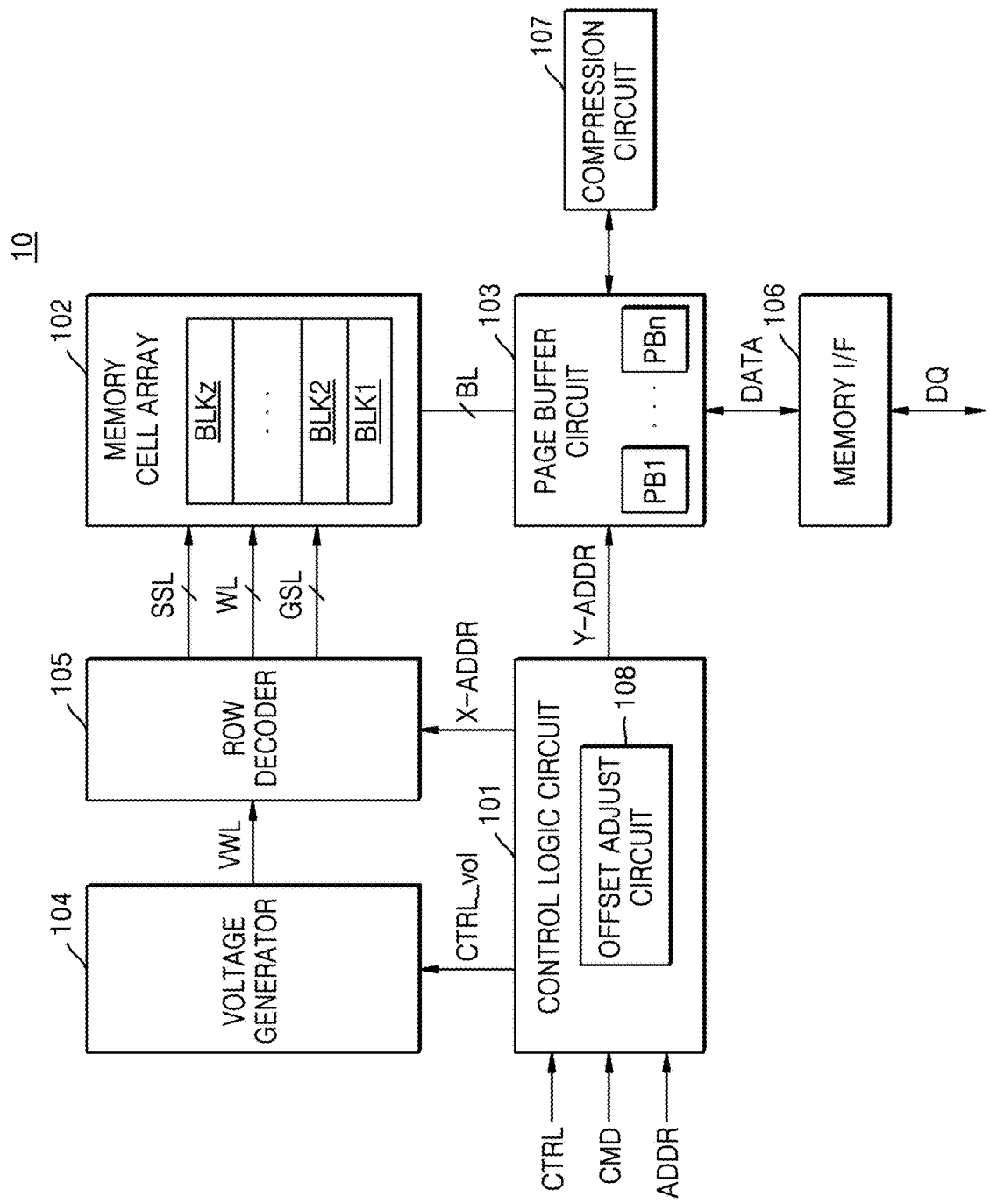
FIG. 2 is a block diagram of an example of a non-volatile memory device.

FIG. 2 is a block diagram of an example of a non-volatile memory device 10. The memory device of FIG. 2 may correspond to at least one of a plurality of NVM devices NVM11 to NVMmn. Referring to FIG. 2, the non-volatile memory device 10 may include a control logic circuit 101, a memory cell array 102, a page buffer circuit 103, a voltage generator 104, and a row decoder 105, a memory interface circuit 106 and a compression circuit 107. Although not shown in FIG. 2, the non-volatile memory device 10 may further include a column logic, a pre-decoder, a temperature sensor, a command decoder, and/or an address decoder.

The control logic circuit 101 may control all various operations of the memory device 300. The control logic circuit 101 may output various control signals in response to commands CMD and/or addresses ADDR from the memory interface circuit 106. For example, the control logic circuit 101 may output a voltage control signal CTRL_vol, a row address X-ADDR, and a column address Y-ADDR.

The memory cell array 102 may include a plurality of memory blocks BLK1 to BLKz (here, z is a positive integer), each of which may include a plurality of memory cells. The memory cell array 102 may be connected to the page buffer circuit 103 through bit lines BL and be connected to the row decoder 105 through word lines WL, string selection lines SSL, and ground selection lines GSL.

In some implementations, the memory cell array 102 may include a 3D memory cell array, which includes a plurality of NAND strings. Each of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In some implementations, the memory cell array 102 may include a 2D memory cell array, which includes a plurality of NAND strings arranged in a row direction and a column direction.

The page buffer circuit 103 may include a plurality of page buffers PB1 to PBn (here, n is an integer greater than or equal to 3), which may be respectively connected to the memory cells through a plurality of bit lines BL. The page buffer circuit 103 may select at least one of the bit lines BL in response to the column address Y-ADDR. The page buffer circuit 103 may operate as a write driver or a sense amplifier according to an operation mode. For example, during a program operation, the page buffer circuit 103 may apply a bit line voltage corresponding to data to be programmed, to the selected bit line. During a read operation, the page buffer circuit 103 may sense current or a voltage of the selected bit line BL and sense data stored in the memory cell.

The page buffer circuit 103 may obtain the hard decision data or the soft decision data from the compression circuit 107. The compression circuit 107 may sequentially generate compressed segments by compressing soft decision segments and may store the compressed segments in the page buffer circuit 103. When the compression of the whole soft decision data is completed, the compressed data may be output to a DQ pin through the memory interface circuit 106. As used herein, the term "DQ pin" may also be referred to as the term "I/O pin".

The compression circuit 107 may generate compressed data by encoding positions of bits, each indicating a minor value, from among bits that are included in the soft decision data. A specific compression method may be described below in detail with reference to FIGS. 12 to 15C. Herein, it is described that the minor value is "1", but implementations of the present disclosure are not limited thereto. A minor value may correspond to an overlap region between adjacent threshold voltage distributions, and a major value may correspond to the other region.

The voltage generator 104 may generate various kinds of voltages for program, read, and erase operations based on the voltage control signal CTRL_vol. For example, the voltage generator 104 may generate a program voltage, a read voltage, a program verification voltage, and an erase voltage as a word line voltage VWL. During a read operation for the hard decision data, the voltage generator 104 may generate a hard read voltage and provide the hard read voltage to the row decoder 105. During a read operation for the soft decision data, the voltage generator 104 may generate a soft read voltage and provide the soft read voltage to the row decoder 105.

The row decoder 105 may select one of a plurality of word lines WL and select one of a plurality of string selection lines SSL in response to the row address X-ADDR. For example, the row decoder 105 may apply the program voltage and the program verification voltage to the selected word line WL during a program operation and apply the read voltage to the selected word line WL during a read operation.

The memory interface circuit 106 may transmit and receive data through the DQ pin.

The control logic circuit 101 may include an offset adjust circuit 108. The offset adjust circuit 108 may adjust the level of a voltage offset added to or subtracted from the hard read voltage to calculate the soft read voltage. In some implementations, the NVM device 10 may receive the command CMD including the level of the voltage offset from the memory controller 200, and the offset adjust circuit 108 may determine the level of the soft read voltage based on the level of the voltage offset in the command CMD and may output the voltage control signal CTRL_vol such that the voltage generator 104 generates the soft read voltage at the determined level. In some implementations, the NVM device 10 may receive the command CMD, which requests to change the voltage offset, from the memory controller 200, and the offset adjust circuit 108 may reduce the voltage offset by as much as a predetermined level. The offset adjust circuit 108 may determine the level of the soft read voltage based on the level of the voltage offset that is reduced and may output the voltage control signal CTRL_vol such that the voltage generator 104 generates the soft read voltage at the determined level. Although the offset adjust circuit 108 is shown as being included in the control logic circuit 101, implementations of the present disclosure are not limited thereto. The offset adjust circuit 108 may be implemented by hardware separate from the control logic circuit 101.

Figure 3:
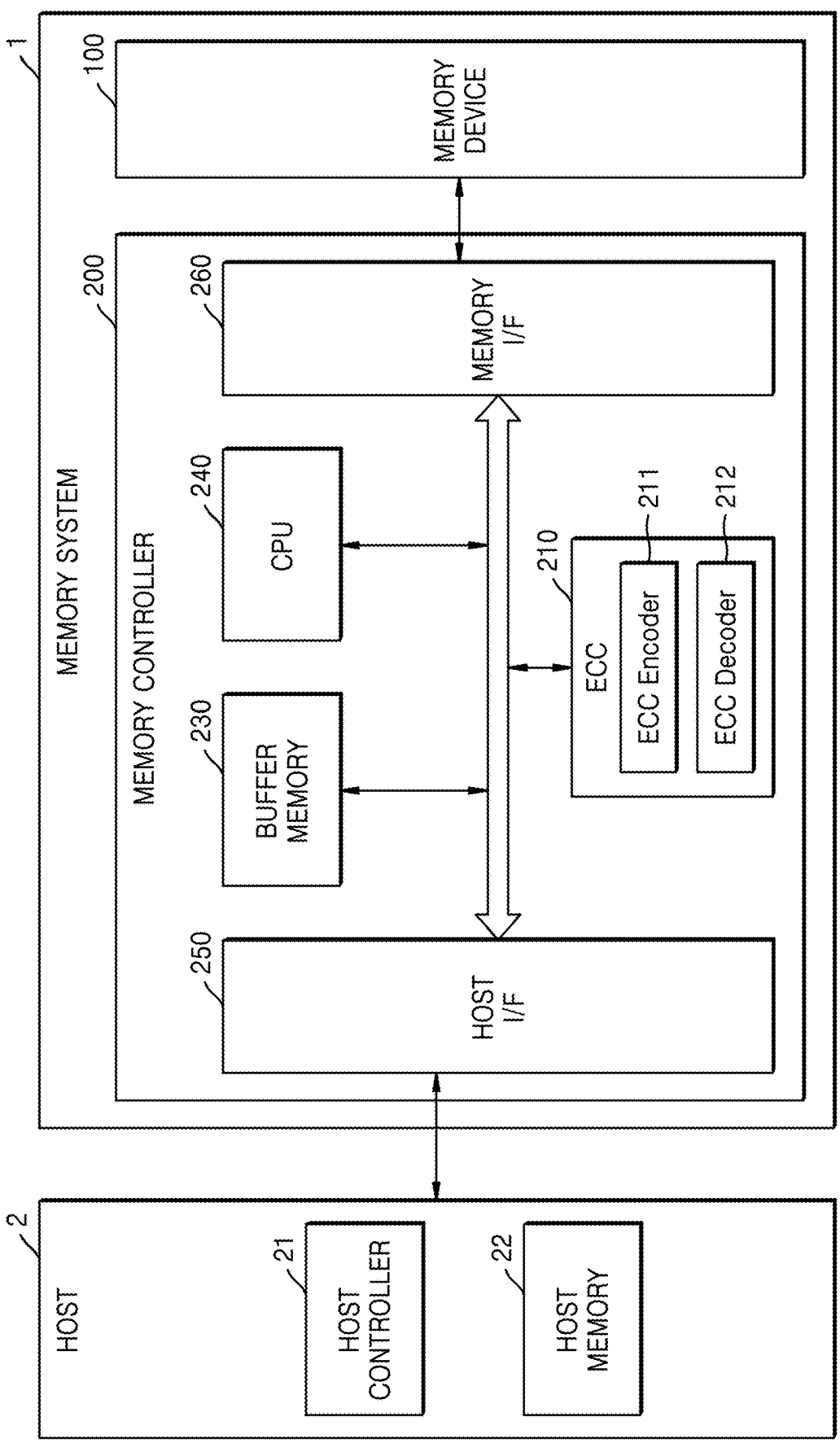
FIG. 3 is a block diagram of an example of a host-memory system.

FIG. 3 is a block diagram of an example of a host-memory system.

A host-memory system 3 may include a host 2 and a memory system 1. In addition, the memory system 1 may include a memory controller 200 and a memory device 100. In addition, the host 2 may include a host controller 21 and a host memory 22. The host memory 22 may function as a buffer memory for temporarily storing data that is to be transmitted to the memory system 1 or has been transmitted from the memory system 1.

The memory system 1 may include storage media for storing data according to a request from the host 2. As an example, the memory system 1 may include at least one of a solid-state drive (SSD), embedded memory, and detachable external memory. When the memory system 1 corresponds to an SSD, the memory system 1 may be a device conforming to the non-volatile memory express (NVMe) specifications. When the memory system 1 corresponds to embedded memory or external memory, the memory system 1 may be a device conforming to the universal flash storage (UFS) specifications or the embedded multi-media card (eMMC) specifications. Each of the host 2 and the memory system 1 may generate a packet according to an employed standard protocol and transmit the packet.

When the memory device 100 of the memory system 1 includes flash memory, the flash memory may include a 2-dimensional (2D) NAND memory array or a 3-dimensional (3D) (or vertical) NAND (VNAND) memory array. As another example, the memory system 1 may include other various kinds of NVMs. Examples of the memory system 1 may include magnetic RAM (MRAM), spin-transfer torque MRAM, conductive bridging RAM (CBRAM), ferroelectric RAM (FeRAM), phase-change RAM (PRAM), resistive RAM, and other various kinds of memory.

In some implementations, the host controller 21 and the host memory 22 may be respectively implemented by separate semiconductor chips. Alternatively, in some implementations, the host controller 21 and the host memory 22 may be integrated in the same semiconductor chip. As an example, the host controller 21 may be one of a plurality of modules arranged in an application processor, and the application processor may be implemented by a system-on-chip (SoC). In addition, the host memory 22 may include embedded memory arranged in the application processor or a memory module or non-volatile memory arranged outside the application processor.

The host controller 21 may manage an operation of storing data (for example, recorded data) of the host memory 22 in the memory device 100 or storing data (for example, read data) of the memory device 100 in the host memory 22.

The memory controller 200 may include a host interface 250, a memory interface 260, a central processing unit (CPU) 240, a buffer memory 230, and an ECC circuit 210.

The host interface 250 may transmit a packet to and receive a packet from the host 2. The packet transmitted from the host 2 to the host interface 250 may include a command, data to be written to the memory device 100, and the like, and the packet transmitted from the host interface 250 to the host 2 may include a response to the command, data read from the memory device 100, and the like. The memory interface 260 may transmit data to be written to the memory device 100 to the memory device 100 or may receive data read from the memory device 100. The memory interface 260 as such may be implemented to comply with standard specifications, such as Toggle or Open NAND Flash Interface (ONFI).

The ECC circuit 210 may perform an error detection and correction function on read data, which is read from the memory device 100. More specifically, the ECC circuit 210 may generate parity bits for normal data that is to be written to the memory device 100, and the parity bits generated as such, together with the normal data, may be stored in the memory device 100. When data is read from the memory device 100, the ECC circuit 210 may correct errors in the normal data by using the parity bits, together with the normal data, read from the memory device 100 and may output the normal data that is error-corrected.

The ECC circuit 210 may include an ECC encoder 211 and an ECC decoder 212. The ECC encoder 211 generates a codeword, in which a parity bit is added to normal data that is input through the host interface 250. The codeword may be stored in the memory device 100. During a read operation, the codeword may be read from the memory device 100 according to the hard decision method. That is, the codeword may correspond to hard decision data.

The ECC decoder 212 may perform error correction decoding on the hard decision data received from the memory device 100. The hard decision data received from the memory device 100 may be transmitted to the ECC decoder 212, and the ECC decoder 212 may correct an error bit in the normal data by using the parity bit in the hard decision data. The ECC circuit 210 may use, for example, LDPC code.

Although not shown, the ECC decoder 212 may include the compression quality estimator 220 of FIG. 1. The compression quality estimator 220 may estimate the compression quality of compressed data received from the memory device 100. The ECC decoder 212 may output a signal for requesting to change a voltage offset, based on the compression quality. The quality of the compressed data by the changed voltage offset may be higher than the quality of the previous compressed data.

In some implementations, the memory controller 200 may receive compressed data having improved compression quality from the memory device 100. Therefore, the reliability of soft decision data, which is obtained through a decompression operation, may improve. That is, the memory controller 200 may obtain the soft decision data with high quality. Because the ECC decoder 212 performs error correction on the hard decision data, based on the soft decision data, the soft decision data with high quality may be obtained, thereby improving ECC performance.

Figure 4:
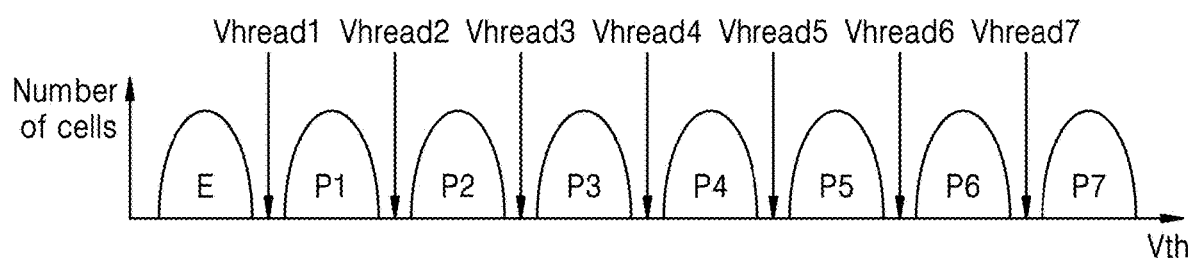
FIG. 4 is a diagram illustrating an example of a threshold voltage distribution of an ideal triple-level cell (TLC).

FIG. 4 is a diagram illustrating an example of a threshold voltage distribution of an ideal triple-level cell (TLC).

Referring to FIGS. 2 and 4, when the NVM device 10 corresponds to a TLC memory device capable of storing 3 bits in one memory cell in the memory cell array 102, to program 3 bits into one memory cell, the threshold voltage of the memory cell may be programmed to be one of 8 threshold voltages. However, because there is a difference in electrical characteristics between memory cells programmed to have the same threshold voltage, threshold voltages of a plurality of memory cells programmed to have the same threshold voltage may form threshold voltage distributions as shown in FIG. 4. Therefore, in the case of a TLC memory device, 8 threshold voltage distributions (that is, E and P1 to P7) may be formed.

When the threshold voltage distributions of the memory cell array 102 are ideal as shown in FIG. 4, a read operation may be performed by using hard read voltages Vhread1 to Vhread7 shown in FIG. 4, whereby read data having fewer errors may be obtained and there may be a high probability that error correction decoding succeeds. Herein, the read operation using the hard read voltages Vhread1 to Vhread7 may be referred to as a hard decision read operation. The hard decision read operation may refer to reading data, which is stored in a memory cell, as 1 or 0 according to the On state or Off state of the memory cell, when the hard read voltages Vhread1 to Vhread7 are supplied to a word line of the memory cell.

The threshold voltage distributions may deteriorate along with the repetition of an operation on the memory cell array 102.

Figure 5:
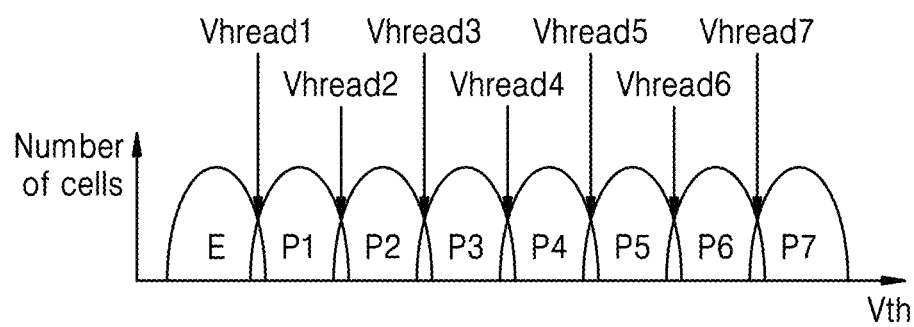
FIG. 5 is an example diagram illustrating that a threshold voltage distribution of a TLC has deteriorated.

FIG. 5 is an example diagram illustrating that a threshold voltage distribution of a TLC has deteriorated.

Referring to FIG. 5, due to charge loss generated by the emission of electrons stored in the memory cell in the memory cell array 102 as time passes, the threshold voltage distribution may be shifted to the left or the right. Thus, the threshold voltage distributions in an erase state E and seven program states P1 to P7 may overlap each other.

In the case where the threshold voltage distributions overlap each other as such, when a read operation has been performed by using the hard read voltages Vhread1 to Vhread7, an uncorrectable error correction code (UECC) error may be generated due to a lot of error bits.

For example, when a read operation is performed by using the hard read voltage Vhread1, although an On cell in the erase state E on the left needs to be distinguished from an Off cell in the program state P1 on the right, in the case where cell distributions of memory cells overlap each other as shown in FIG. 4, there may be a memory cell read as an Off cell despite actually being an On cell and there may be a memory cell read as an On cell despite actually being an Off cell.

Therefore, in the case where threshold voltage distributions are as shown in FIG. 5, when a read operation is performed by using the hard read voltages Vhread1 to Vhread7, because the memory controller 200 receives hard decision data having a lot of errors, there may be a high probability that error correction decoding fails.

Therefore, the memory controller 200 may receive compressed data for soft decision data from the memory device 100 and may perform decompression on the compressed data, thereby obtaining the soft decision data. The memory controller 200 may perform error correction decoding on the hard decision data, based on the soft decision data. By distinguishing an overlap region between the threshold voltage distributions from the other region, the soft decision data may indicate the reliability of the hard decision data.

Figure 6A:
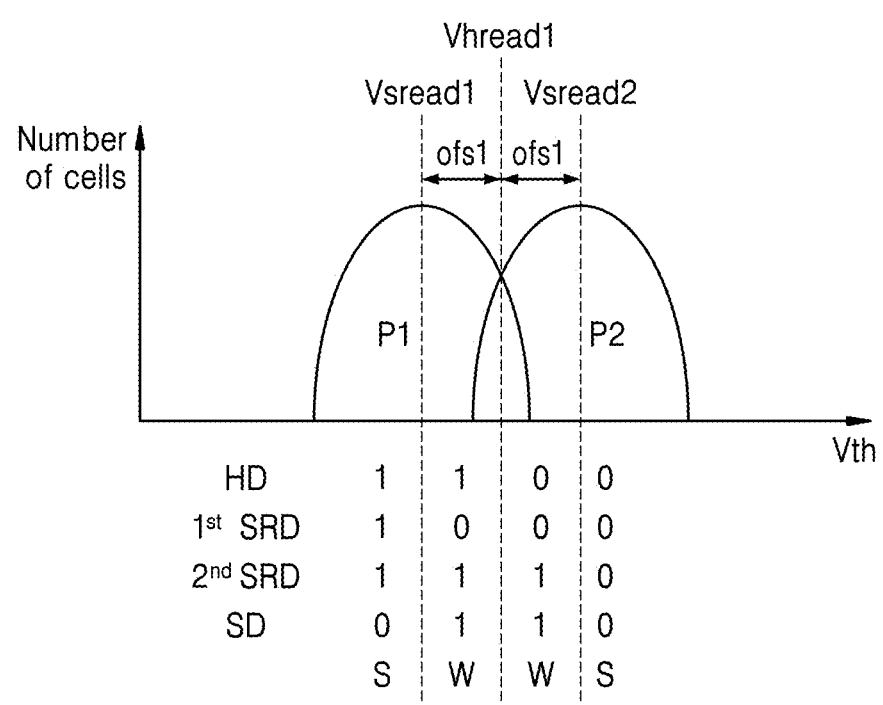
FIGS. 6A and 6B are example diagrams each illustrating a soft decision read operation.
Figure 6B:
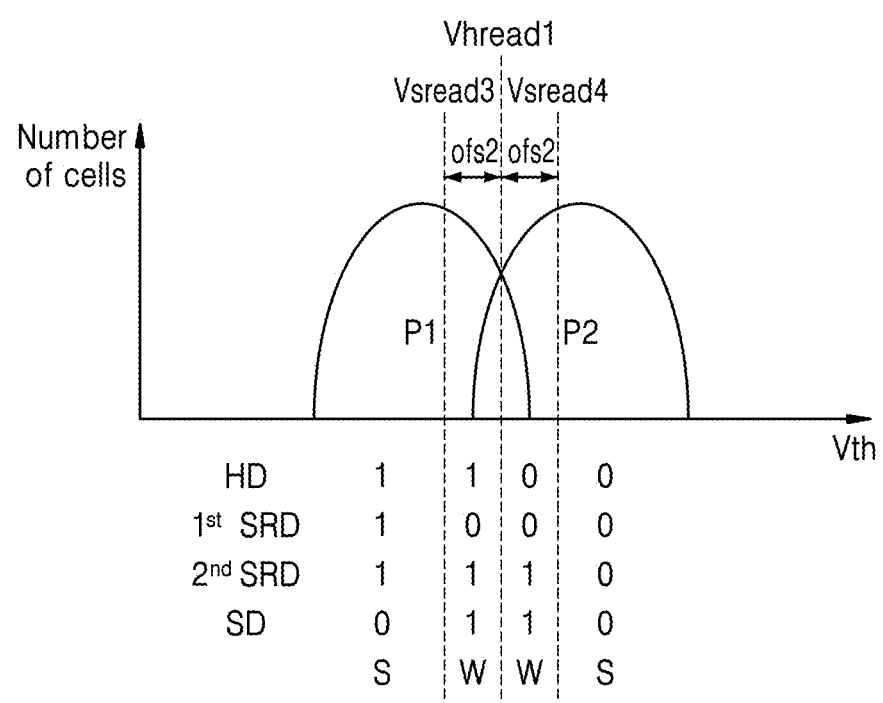

FIGS. 6A and 6B are example diagrams each illustrating a soft decision read operation.

As shown in FIG. 6A, soft read voltages used in the soft decision read operation may be Vsread1 and Vsread2. The soft decision read operation may refer to an operation of forming information for adding reliability to hard decision data HD by applying, to a memory cell, a plurality of soft read voltages Vsread1 and Vsread2 having a certain voltage difference (that is, a voltage offset) from the hard read voltage Vhread1 that is a reference. In FIG. 6A, the voltage offset may be ofs1. The soft read voltage Vsread1 may have a level obtained by subtracting ofs1 from the hard read voltage Vhread1. The soft read voltage Vsread2 may have a level obtained by adding ofs1 to the hard read voltage Vhread1. When the soft read voltage Vsread1 is applied to a memory cell, data (that is, 1st SRD) determined according to On or Off of the memory cell may be 1, 0, 0, and 0. When the soft read voltage Vsread2 is applied to a memory cell, data (that is, 2nd SRD) determined according to On or Off of the memory cell may be 1, 1, 1, and 0.

By performing an exclusive OR (XOR) operation on the read values (that is, 1st SRD and 2nd SRD) obtained by two read operations, soft decision data SD may be formed. As shown in FIG. 6A, the soft decision data SD may be 0, 1, 1, and 0. The XOR operation may be performed in the page buffer circuit 103. That is, the XOR operation may be performed on the read values (that is, 1st SRD and 2nd SRD), which are obtained by two read operations, by using a plurality of latches in the page buffer circuit 103. The soft decision data SD may indicate the reliability of the hard decision data HD. When the soft decision data SD is 0, it may be meant that the reliability of the hard decision data HD is high, that is, strong(S), and when the soft decision data SD is 1, it may mean that the reliability of the hard decision data HD is low, that is, weak (W). That is, 10, 11, 01, and 00, which are respectively combinations of the hard decision data HD, 1, 1, 0, and 0 with the soft decision data SD, 0, 1, 1, and 0, may represent the high-reliability hard decision data HD, 1, the low-reliability hard decision data HD, 1, the low-reliability hard decision data HD, 0, and the high-reliability hard decision data HD, 0, respectively.

As compared with the distribution width of each of the state P1 and the state P2, the width of an overlap region between the state P1 and the state P2 may be extremely small. Therefore, when the soft decision data SD is read from a plurality of memory cells, for example, 4 KB memory cells, which are programmed with the state P1 and the state P2, the number of 1's, each indicating the overlap region, may be much less than the number of 0's, each indicating the other region.

The compression circuit 107 of FIGS. 1 and 2 may generate compressed data by compressing the soft decision data SD and provide the compressed data to the memory controller 200.

In FIG. 6B, the voltage offset, ofs2, may be less than the voltage offset, ofs1, of FIG. 6A. That is, the width of the overlap region between the soft read voltages Vsread3 and Vsread4 may be less than the width of the overlap region between the soft read voltages Vsread1 and Vsread2.

Therefore, the number of "1"s in the soft decision data SD that is read based on the voltage offset, ofs2, may be less than that in the soft decision data SD that is read based on the voltage offset, ofs1. In addition, the number of position values for "1"s in the compressed data of the soft decision data SD that is read based on the voltage offset, ofs2, may be less than the number of position values for "1"s in the compressed data of the soft decision data SD that is read based on the voltage offset, ofs1.

In some implementations, when receiving the compressed data with low quality, the memory controller 200 may request the memory device 100 to read the soft decision data by using a relatively small voltage offset. When the soft decision data is read by using a relatively small voltage offset, because the number of "1"s in the soft decision data is reduced, the loss of the position values may be reduced. Therefore, the quality of the compressed data corresponding to the soft decision data, which is read based on a small voltage offset, may improve.

Although FIGS. 6A and 6B each illustrate that there is one voltage offset, implementations of the present disclosure are not limited thereto and the soft decision data may be read by using a plurality of voltage offsets. For example, first soft decision data may be read based on a first voltage offset and second soft decision data may be read based on a second voltage offset. Combinations of the first soft decision data and the second soft decision data may represent the reliability of hard decision data by 6 categories (that is, very strong 1, strong 1, weak 1, weak 0, strong 0, and very strong 0). In some implementations, the memory controller 200 may request the memory device 100 to generate the soft decision data by adjusting at least one of the plurality of voltage offsets to be smaller.

Figure 7:
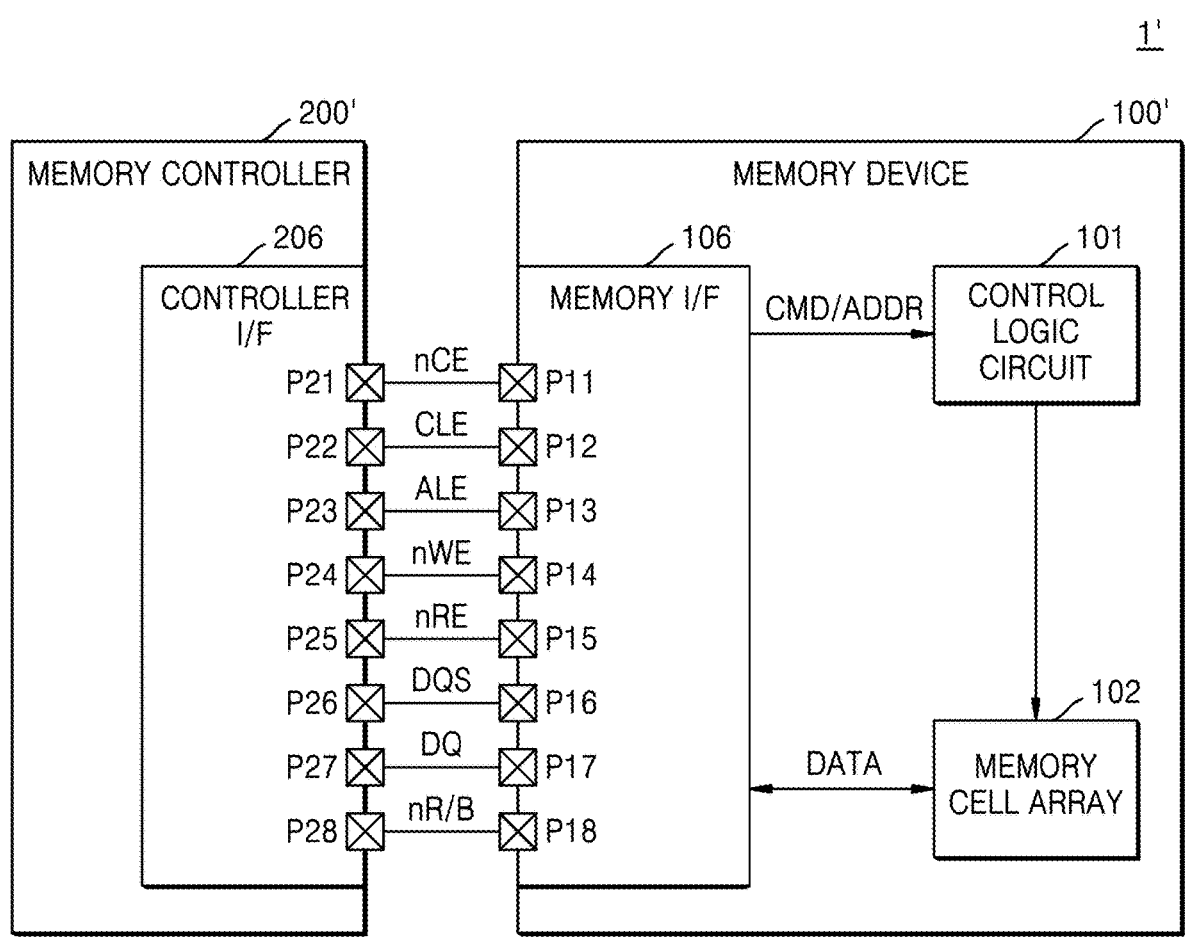
FIG. 7 is a block diagram of an example of a memory system.

FIG. 7 is a block diagram of an example of a memory system 1'. Referring to FIG. 7, the memory system 1' may include a memory device 100' and a memory controller 200'. The memory device 100' may correspond to one of NVM devices NVM11 to NVMmn, which communicate with a memory controller 200' based on one of the plurality of channels CH1 to CHm of FIG. 1. The memory controller 200' may correspond to the memory controller 200 of FIG. 1.

The memory device 100' may include first to eighth pins P11 to P18, a memory interface circuit 106, a control logic circuit 101, and a memory cell array 102.

The memory interface circuit 106 may receive a chip enable signal nCE from the memory controller 200' through the first pin P11. The memory interface circuit 106 may transmit and receive signals to and from the memory controller 200' through the second to eighth pins P12 to P18 in response to the chip enable signal nCE. For example, when the chip enable signal nCE is in an enable state (e.g., a low level), the memory interface circuit 106 may transmit and receive signals to and from the memory controller 200' through the second to eighth pins P12 to P18.

The memory interface circuit 106 may receive a command latch enable signal CLE, an address latch enable signal ALE, and a write enable signal nWE from the memory controller 200' through the second to fourth pins P12 to P14. The memory interface circuit 106 may receive a data signal DQ from the memory controller 200' through the seventh pin P17 or transmit the data signal DQ to the memory controller 200'. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s). For example, as shown FIG. 9a, the memory device 100' may provide data DATA to the memory controller 200' via 8 DQ pins (DQ0 to DQ7).

The memory interface circuit 106 may obtain the command CMD from the data signal DQ, which is received in an enable section (e.g., a high-level state) of the command latch enable signal CLE based on toggle time points of the write enable signal nWE. The memory interface circuit 106 may obtain the address ADDR from the data signal DQ, which is received in an enable section (e.g., a high-level state) of the address latch enable signal ALE based on the toggle time points of the write enable signal nWE.

In some implementations, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuit 106 may obtain the command CMD or the address ADDR based on toggle time points of the write enable signal nWE.

The memory interface circuit 106 may receive a read enable signal nRE from the memory controller 200' through the fifth pin P15. The memory interface circuit 106 may receive a data strobe signal DQS from the memory controller 200' through the sixth pin P16 or transmit the data strobe signal DQS to the memory controller 200'.

In a data (DATA) output operation of the memory device 100', the memory interface circuit 106 may receive the read enable signal nRE, which toggles through the fifth pin P15, before outputting the data DATA. The memory interface circuit 106 may generate the data strobe signal DQS, which toggles based on the toggling of the read enable signal nRE. For example, the memory interface circuit 106 may generate a data strobe signal DQS, which starts toggling after a predetermined delay (e.g., tDQSRE), based on a toggling start time of the read enable signal nRE. The memory interface circuit 106 may transmit the data signal DQ including the data DATA based on a toggle time point of the data strobe signal DQS. Thus, the data DATA may be aligned with the toggle time point of the data strobe signal DQS and transmitted to the memory controller 200'.

In a data (DATA) input operation of the memory device 100', when the data signal DQ including the data DATA is received from the memory controller 200', the memory interface circuit 106 may receive the data strobe signal DQS, which toggles, along with the data DATA from the memory controller 200'. The memory interface circuit 106 may obtain the data DATA from the data signal DQ based on toggle time points of the data strobe signal DQS. For example, the memory interface circuit 106 may sample the data signal DQ at rising and falling edges of the data strobe signal DQS and obtain the data DATA.

The memory interface circuit 106 may transmit a ready/busy output signal nR/B to the memory controller 200' through the eighth pin P18. The memory interface circuit 106 may transmit state information of the memory device 100' through the ready/busy output signal nR/B to the memory controller 200'. When the memory device 100' is in a busy state (i.e., when operations are being performed in the memory device 100'), the memory interface circuit 106 may transmit a ready/busy output signal nR/B indicating the busy state to the memory controller 200'. When the memory device 100' is in a ready state (i.e., when operations are not performed or completed in the memory device 100'), the memory interface circuit 106 may transmit a ready/busy output signal nR/B indicating the ready state to the memory controller 200'. For example, while the memory device 100' is reading data DATA from the memory cell array 102 in response to a page read command, the memory interface circuit 106 may transmit a ready/busy output signal nR/B indicating a busy state (e.g., a low level) to the memory controller 200'. For example, while the memory device 100' is programming data DATA to the memory cell array 102 in response to a program command, the memory interface circuit 106 may transmit a ready/busy output signal nR/B indicating the busy state to the memory controller 200'.

The control logic circuit 101 may control all operations of the memory device 100'. The control logic circuit 101 may receive the command/address CMD/ADDR obtained from the memory interface circuit 106. The control logic circuit 101 may generate control signals for controlling other components of the memory device 100' in response to the received command/address CMD/ADDR. For example, the control logic circuit 101 may generate various control signals for programming data DATA to the memory cell array 102 or reading the data DATA from the memory cell array 102.

The memory cell array 102 may store the data DATA obtained from the memory interface circuit 106, via the control of the control logic circuit 101. The memory cell array 102 may output the stored data DATA to the memory interface circuit 106 via the control of the control logic circuit 101.

The memory cell array 102 may include a plurality of memory cells. For example, the plurality of memory cells may be flash memory cells. However, the present disclosure is not limited thereto, and the memory cells may be RRAM cells, FRAM cells, PRAM cells, thyristor RAM (TRAM) cells, or MRAM cells. Hereinafter, an implementation in which the memory cells are NAND flash memory cells will mainly be described.

The memory controller 200' may include first to eighth pins P21 to P28 and a controller interface circuit 230. The first to eighth pins P21 to P28 may respectively correspond to the first to eighth pins P11 to P18 of the memory device 100'.

The controller interface circuit 230 may transmit a chip enable signal nCE to the memory device 100' through the first pin P21. The controller interface circuit 230 may transmit and receive signals to and from the memory device 100', which is selected by the chip enable signal nCE, through the second to eighth pins P22 to P28.

The controller interface circuit 230 may transmit the command latch enable signal CLE, the address latch enable signal ALE, and the write enable signal nWE to the memory device 100' through the second to fourth pins P22 to P24. The controller interface circuit 230 may transmit or receive the data signal DQ to and from the memory device 100' through the seventh pin P27.

The controller interface circuit 230 may transmit the data signal DQ including the command CMD or the address ADDR to the memory device 100' along with the write enable signal nWE, which toggles. The controller interface circuit 230 may transmit the data signal DQ including the command CMD to the memory device 100' by transmitting a command latch enable signal CLE having an enable state. Also, the controller interface circuit 230 may transmit the data signal DQ including the address ADDR to the memory device 100' by transmitting an address latch enable signal ALE having an enable state.

The controller interface circuit 230 may transmit the read enable signal nRE to the memory device 100' through the fifth pin P25. The controller interface circuit 230 may receive or transmit the data strobe signal DQS from or to the memory device 100' through the sixth pin P26.

In a data (DATA) output operation of the memory device 100', the controller interface circuit 230 may generate a read enable signal nRE, which toggles, and transmit the read enable signal nRE to the memory device 100'. For example, before outputting data DATA, the controller interface circuit 230 may generate a read enable signal nRE, which is changed from a static state (e.g., a high level or a low level) to a toggling state. Thus, the memory device 100' may generate a data strobe signal DQS, which toggles, based on the read enable signal nRE. The controller interface circuit 230 may receive the data signal DQ including the data DATA along with the data strobe signal DQS, which toggles, from the memory device 100'. The controller interface circuit 230 may obtain the data DATA from the data signal DQ based on a toggle time point of the data strobe signal DQS.

In a data (DATA) input operation of the memory device 100', the controller interface circuit 230 may generate a data strobe signal DQS, which toggles. For example, before transmitting data DATA, the controller interface circuit 230 may generate a data strobe signal DQS, which is changed from a static state (e.g., a high level or a low level) to a toggling state. The controller interface circuit 230 may transmit the data signal DQ including the data DATA to the memory device 100' based on toggle time points of the data strobe signal DQS.

The controller interface circuit 230 may receive a ready/busy output signal nR/B from the memory device 100' through the eighth pin P28. The controller interface circuit 230 may determine state information of the memory device 100' based on the ready/busy output signal nR/B.

Although not shown in FIG. 7, the memory device 100' may include a plurality of memory cell arrays and the memory interface circuit 106 may provide hard decision data and soft decision data obtained from the plurality of memory cell arrays via the seventh pin P17.

Figure 8A:
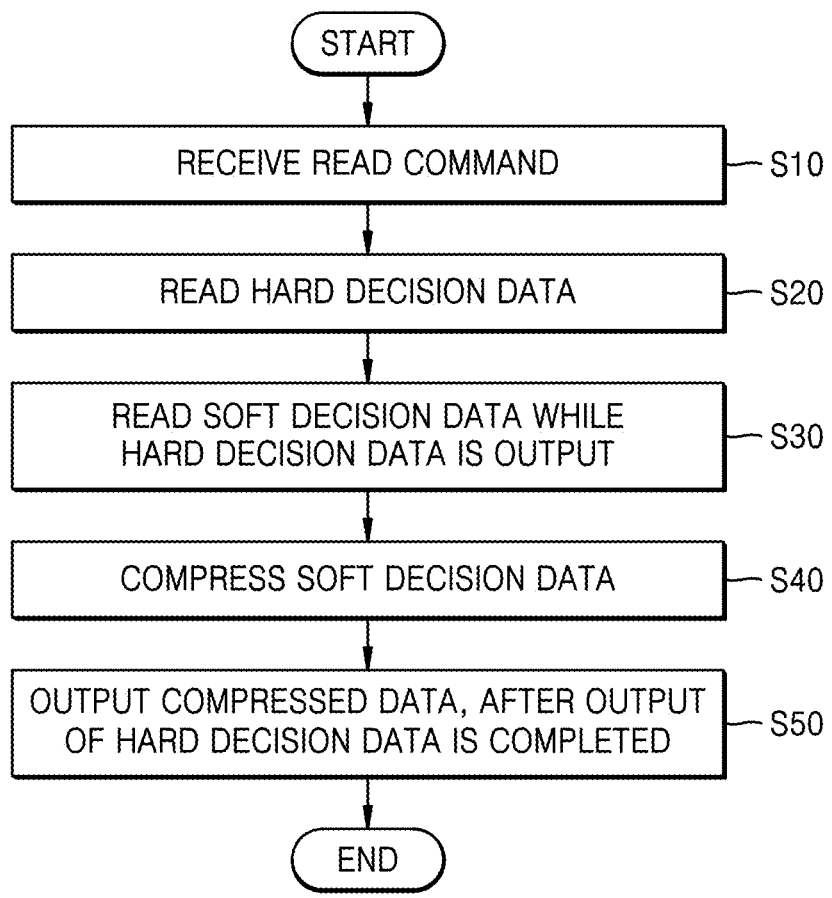
FIGS. 8A and 8B are example diagrams illustrating a read operation.
Figure 8B:
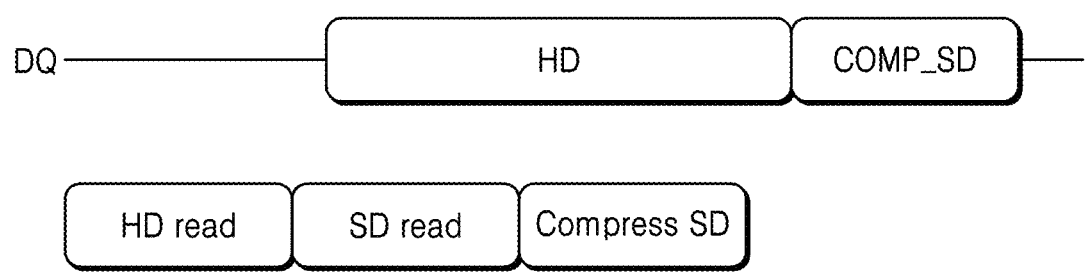

FIGS. 8A and 8B are example diagrams illustrating a read operation. FIGS. 8A and 8B may be described with reference to FIG. 2.

Referring to FIG. 8A, the memory device 10 may receive a read command (S10). The read command may be a command to request hard decision data and compressed data.

The memory device 10 may read hard decision data HD from the memory cell array 102 by using a hard read voltage (for example, Vhread1 of FIG. 6A) (S20). The hard decision data HD that is read may be stored in the page buffer circuit 103.

The memory device 10 may read soft decision data SD from the memory cell array 102 while outputting the hard decision data HD through the memory interface circuit 106 (S30). Referring to FIG. 8B, after the hard decision data HD is read, the hard decision data HD may be output through the DQ pin. The time period in which the hard decision data HD is output may at least partially overlap the time period in which the soft decision data SD is read.

The memory device 10 may generate compressed data COMP_SD by compressing the soft decision data SD that is read. In some implementations, the time period in which the hard decision data HD is output may at least partially overlap the time period in which the soft decision data SD is compressed.

After the output of the hard decision data HD is completed, the memory device 10 may output the compressed data COMP_SD through the DQ pin (S50).

According to the implementations of FIGS. 8A and 8B, the time period in which the soft decision data SD is read or compressed may partially overlap the time period in which the hard decision data HD is output. Therefore, a period of time for which the compressed data COMP_SD and the hard decision data HD are provided to the memory controller 200 in response to the read command may be reduced.

Figure 9A:
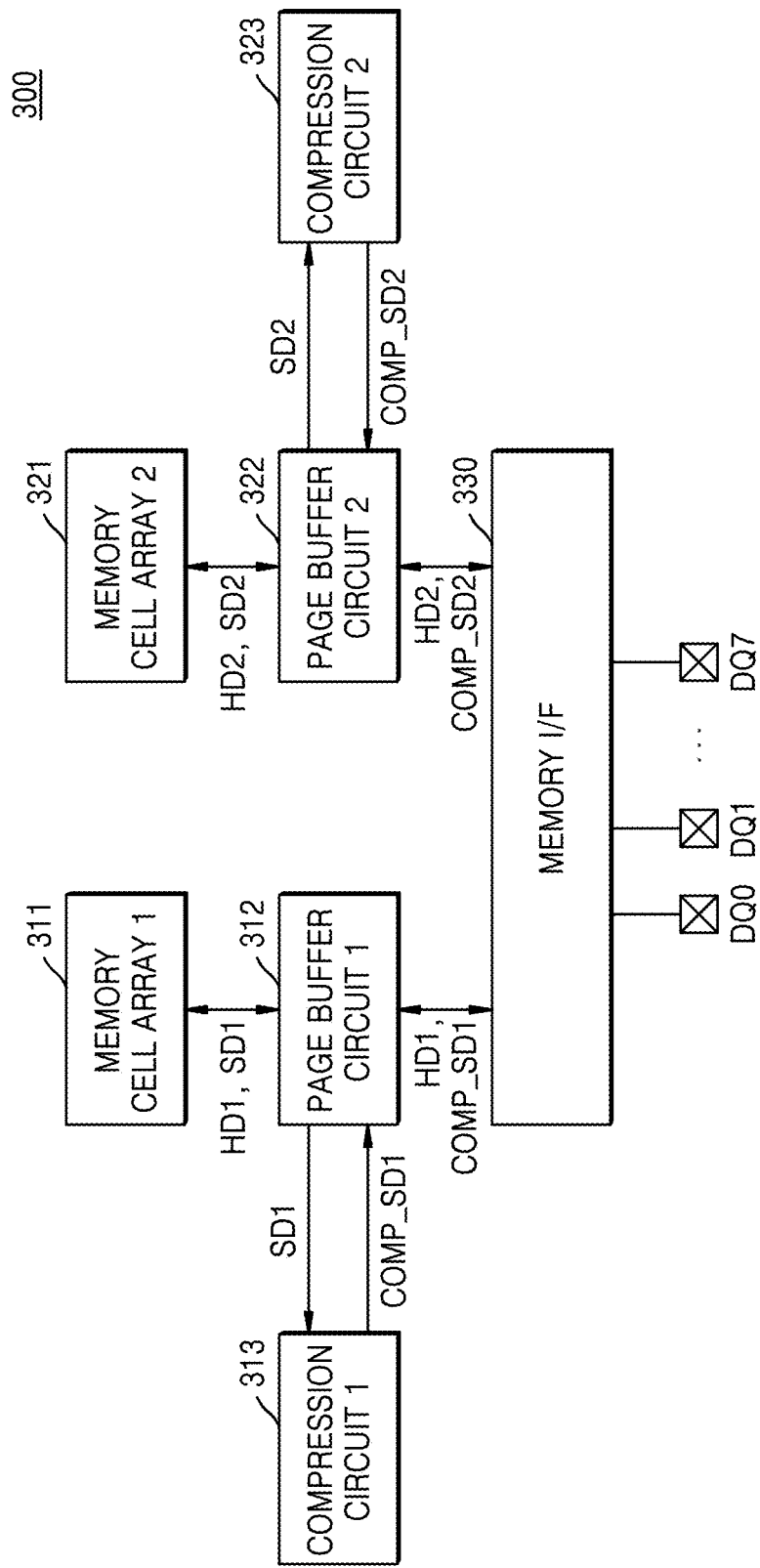
FIGS. 9A to 9C are example diagrams illustrating a read operation.
Figure 9B:
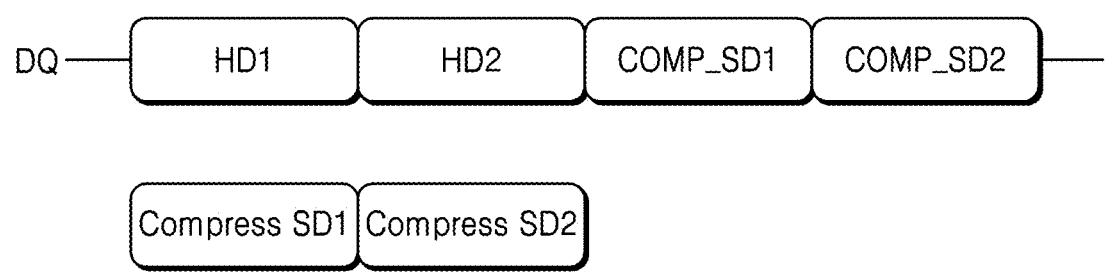
Figure 9C:
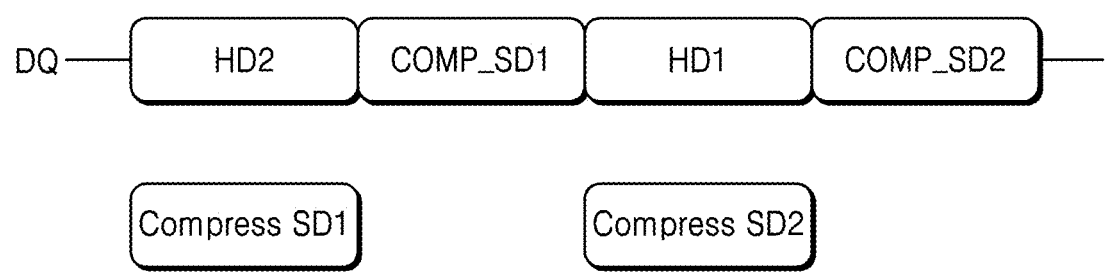

FIGS. 9A to 9C are example diagrams illustrating a read operation.

Referring to FIG. 9A, a memory device 300 may include first and second memory cell arrays 311 and 321, first and second page buffer circuits 312 and 322, first and second compression circuits 313 and 323, and a memory interface circuit 330. The memory device 300 may receive a particular type of read command from a memory controller (for example, 200 of FIG. 1), may read hard decision data and soft decision data from at least one of the first and second memory cell arrays 311 and 321, may compress the soft decision data, and may provide the hard decision data and the compressed soft decision data (that is, compressed data) to the memory controller 200 (see FIG. 1). In some implementations, the particular type of read command may be referred to as a fast read command.

Specifically, the first page buffer circuit 312 may obtain first hard decision data HD1 and first soft decision data SD1 from the first memory cell array 311. The first compression circuit 313 may generate first compressed data COMP_SD1 by compressing the first soft decision data SD1. The first page buffer circuit 312 may provide the first hard decision data HD1 and the first compressed data COMP_SD1 to the memory interface circuit 330.

The second page buffer circuit 322 may obtain second hard decision data HD2 and second soft decision data SD2 from the second memory cell array 321. The second compression circuit 323 may generate second compressed data COMP_SD2 by compressing the second soft decision data SD2. The second page buffer circuit 322 may provide the second hard decision data HD2 and the second compressed data COMP_SD2 to the memory interface circuit 330.

The memory interface circuit 330 may output the first and second hard decision data HD1 and HD2 and the first and second compressed data COMP_SD1 and COMP_SD2 through first to eighth DQ pins DQ0 to DQ7.

Referring to FIG. 9B, the memory interface circuit 330 may sequentially output the first hard decision data HD1 and the second hard decision data HD2. In some implementations, while the first hard decision data HD1 is output through the DQ pins (that is, DQ0 to DQ7), the first compression circuit 313 may compress the first soft decision data SD1. That is, the time period in which the first hard decision data HD1 is output may at least partially overlap the time period in which the first soft decision data SD1 is compressed. Although not shown, in some implementations, the time period in which the first soft decision data SD1 is read from the first memory cell array 311 may at least partially overlap the time period in which the first hard decision data HD1 is output. Before output through the DQ pins, the first compressed data COMP_SD1 may be stored in the first compression circuit 313, the first page buffer circuit 312, or a separately provided buffer.

In addition, while the second hard decision data HD2 is output through the DQ pins (that is, DQ0 to DQ7), the second compression circuit 323 may compress the second soft decision data SD2. That is, the time period in which the second hard decision data HD2 is output may at least partially overlap the time period in which the second soft decision data SD2 is compressed. Although not shown, the time period in which the second soft decision data SD2 is read from the second memory cell array 321 may at least partially overlap the time period in which the second hard decision data HD2 is output. Before output through the DQ pins, the second compressed data COMP_SD2 may be stored in the second compression circuit 323, the second page buffer circuit 322, or a separately provided buffer.

The memory interface circuit 330 may output the first compressed data COMP_SD1 and the second compressed data COMP_SD2 through the DQ pins after outputting the second hard decision data HD2. The order of outputting the first compressed data COMP_SD1 and the second compressed data COMP_SD2 is not limited thereto.

Referring to FIG. 9C, while the memory interface circuit 330 outputs the second hard decision data HD2 through the DQ pins (that is, DQ0 to DQ7), the first compression circuit 313 may compress the first soft decision data SD1. When the output of the second hard decision data HD2 is completed, the memory interface circuit 330 may output the first compressed data COMP_SD1 through the DQ pins (that is, DQ0 to DQ7). When the output of the first compressed data COMP_SD1 is completed, the memory interface circuit 330 may output the first hard decision data HD1 through the DQ pins (that is, DQ0 to DQ7). While the memory interface circuit 330 outputs the first hard decision data HD1 through the DQ pins (that is, DQ0 to DQ7), the second compression circuit 323 may compress the second soft decision data SD2. When the output of the first hard decision data HD1 is completed, the memory interface circuit 330 may output the second compressed data COMP_SD2 through the DQ pins.

Because the compressed soft decision data is output through the DQ pins (that is, DQ0 to DQ7), a period of time for reading the hard decision data and the soft decision data may be reduced.

According to the implementations of FIGS. 9A to 9C, the time period in which at least one of the first and second soft decision data SD1 and SD2 is read or compressed may partially overlap the time period in which at least one of the first and second hard decision data HD1 and HD2 is output. Therefore, a period of time for which the first and second compressed data COMP_SD1 and COMP_SD2 and the first and second hard decision data HD1 and HD2 are provided to the memory controller 200 in response to the read command may be reduced.

Figure 10A:
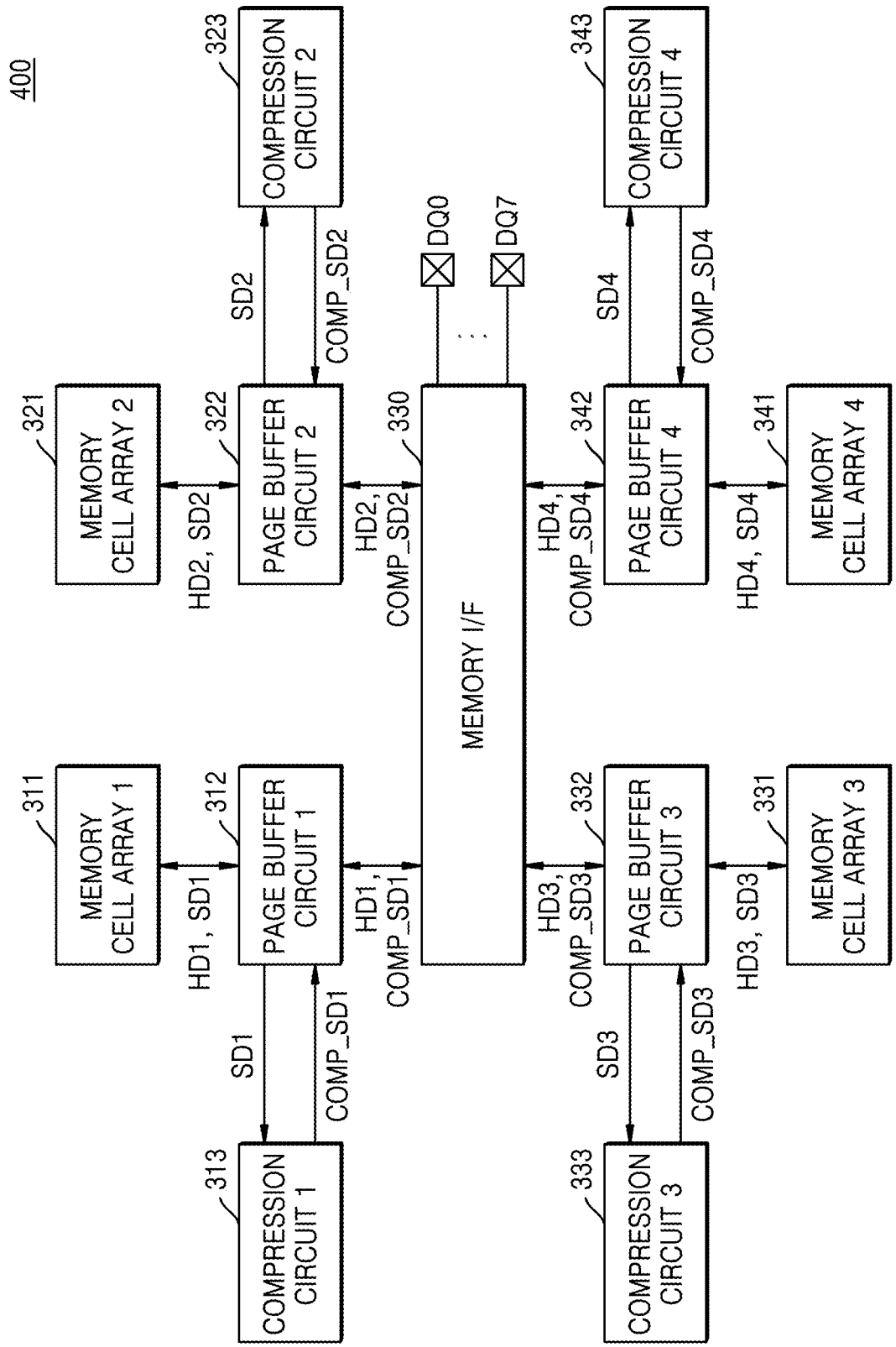
FIGS. 10A and 10B example are diagrams illustrating a read operation.
Figure 10B:
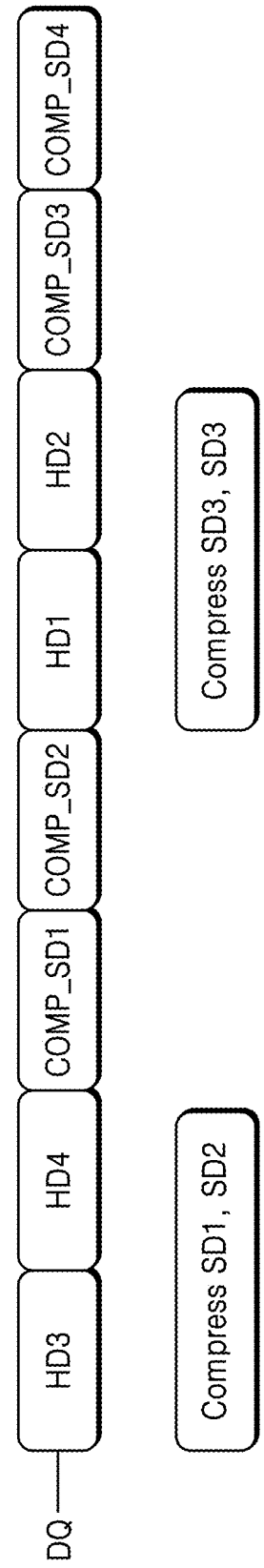

FIGS. 10A and 10B are example diagrams illustrating a read operation.

Referring to FIG. 10A, a memory device 400 may further include third and fourth memory cell arrays 331 and 341, third and fourth page buffer circuits 332 and 342, and third and fourth compression circuits 333 and 343, as compared with the memory device 300.

The third page buffer circuit 332 may obtain third hard decision data HD3 and third soft decision data SD3 from the third memory cell array 331. The third compression circuit 333 may generate third compressed data COMP_SD3 by compressing the third soft decision data SD3. The third page buffer circuit 332 may provide the third hard decision data HD3 and the third compressed data COMP_SD3 to the memory interface circuit 330.

The fourth page buffer circuit 342 may obtain fourth hard decision data HD4 and fourth soft decision data SD4 from the fourth memory cell array 341. The fourth compression circuit 343 may generate fourth compressed data COMP_SD4 by compressing the fourth soft decision data SD4. The fourth page buffer circuit 342 may provide the fourth hard decision data HD4 and the fourth compressed data COMP_SD4 to the memory interface circuit 330.

Referring to FIG. 10B, while the memory interface circuit 330 outputs the third and fourth hard decision data HD3 and HD4 through the DQ pins (that is, DQ0 to DQ7), the first and second compression circuits 313 and 323 may respectively compress the first and second soft decision data SD1 and SD2.

When the output of the third and fourth hard decision data HD3 and HD4 is completed, the memory interface circuit 330 may output the first and second compressed data COMP_SD1 and COMP_SD2.

When the output of the first and second compressed data COMP_SD1 and COMP_SD2 is completed, the memory interface circuit 330 may output the first and second hard decision data HD1 and HD2. While the memory interface circuit 330 outputs the first and second hard decision data HD1 and HD2 through the DQ pins (that is, DQ0 to DQ7), the third and fourth compression circuits 333 and 343 may respectively compress the third and fourth decision data SD3 and SD4.

When the output of the first and second hard decision data HD1 and HD2 is completed, the memory interface circuit 330 may output the third and fourth compressed data COMP_SD3 and COMP_SD4.

In some implementations, the time period in which at least one of the first to fourth soft decision data SD1 to SD4 is read or compressed may partially overlap the time period in which at least one of the first to fourth hard decision data HD1 to HD4 is output. Therefore, a period of time for which the first to fourth compressed data COMP_SD1 to COMP_SD4 and the first to fourth hard decision data HD1 to HD4 are provided to the memory controller 200 in response to the read command may be reduced.

Figure 11:
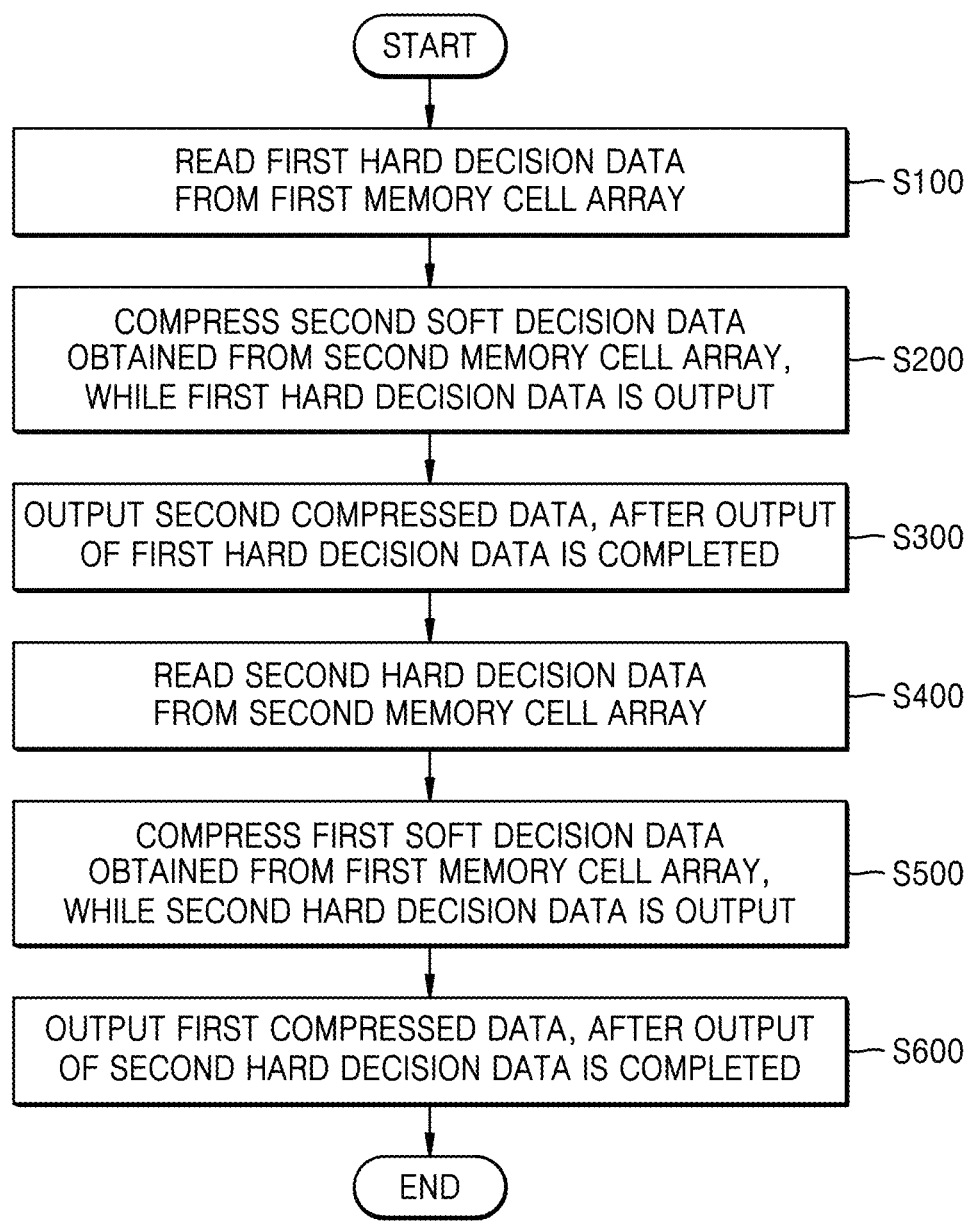
FIG. 11 is a flowchart illustrating an example of a method of operating a memory device.

FIG. 11 is a flowchart illustrating an example of a method of operating a memory device. FIG. 11 may be described with reference to FIG. 9A.

Referring to FIG. 11, the first page buffer circuit 312 may read the first hard decision data HD1 from the first memory cell array 311 (S100).

While the memory interface circuit 330 outputs the first hard decision data HD1 through the DQ pins (that is, DQ0 to DQ7), the second compression circuit 323 may generate the second compressed data COMP_SD2 by compressing the second soft decision data SD2 obtained from the second memory cell array 321 (S200). When compressing the second soft decision data SD2, the second compression circuit 323 may use a compression method described below with reference to FIGS. 13 to 16C.

After the output of the first hard decision data HD1 is completed, the memory interface circuit 330 may output the second compressed data COMP_SD2 through the DQ pins (that is, DQ0 to DQ7) (S300).

The second page buffer circuit 322 may read the second hard decision data HD2 from the second memory cell array 321 (S400). In some implementations, operation S400 may be performed in parallel with operation S300.

While the memory interface circuit 330 outputs the second hard decision data HD2 through the DQ pins (that is, DQ0 to DQ7), the first compression circuit 313 may generate the first compressed data COMP_SD1 by compressing the first soft decision data SD1 obtained from the first memory cell array 311 (S500). When compressing the first soft decision data SD1, the first compression circuit 313 may use the compression method described below with reference to FIGS. 13 to 16C.

After the output of the second hard decision data HD2 is completed, the memory interface circuit 330 may output the first compressed data COMP_SD1 through the DQ pins (that is, DQ0 to DQ7) (S600).

Figure 12:
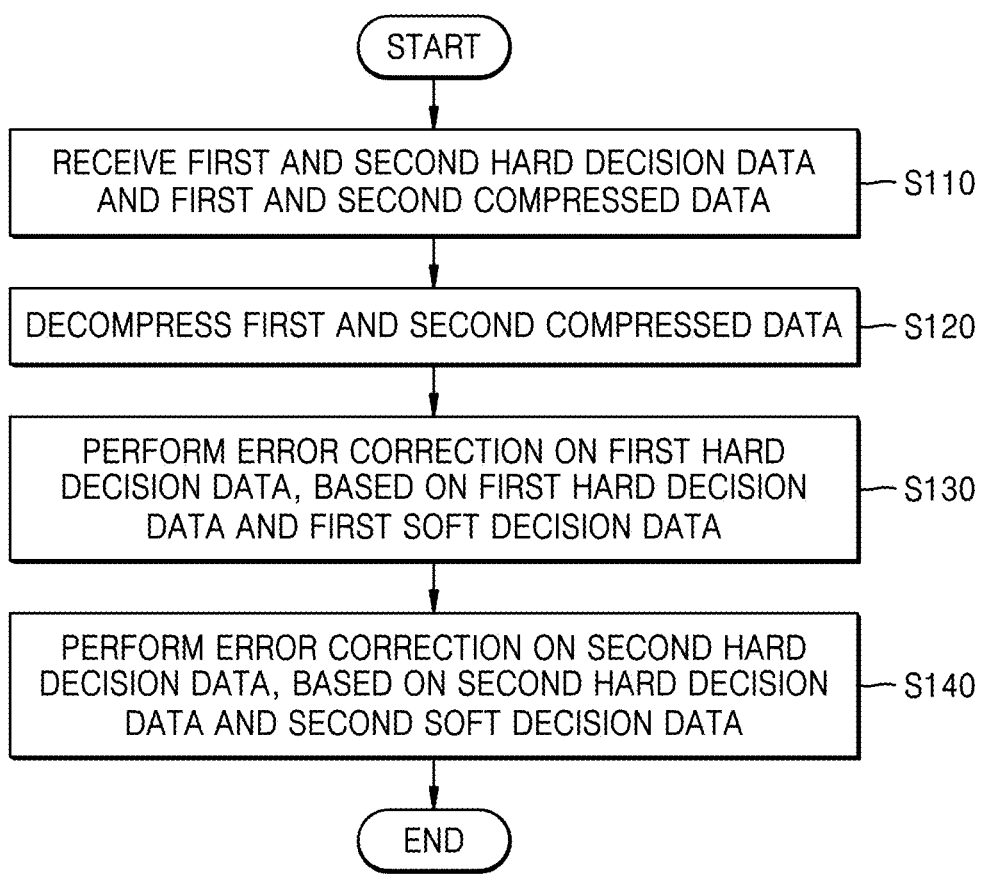
FIG. 12 is a flowchart illustrating an example of a method of operating a memory controller.

FIG. 12 is a flowchart illustrating an example of a method of operating a memory controller. FIG. 12 may be described with reference to FIG. 1, 3, or 9A.

The memory controller 200 may receive the first and second hard decision data HD1 and HD2 and the first and second compressed data COMP_SD1 and COMP_SD2 from a memory device 3000 through the DQ pins (S110).

The ECC decoder 212 of the memory controller 200 may decompress the first and second compressed data COMP_SD1 and COMP_SD2 (S120). When decompressing the first or second compressed data COMP_SD1 or COMP_SD2, the ECC decoder 212 may use a decompression method described below with reference to FIG. 20.

The ECC decoder 212 may perform error correction on the first hard decision data HD1, based on the first hard decision data HD1 and the first soft decision data SD1 (S130).

The ECC decoder 212 may perform error correction on the second hard decision data HD2, based on the second hard decision data HD2 and the second soft decision data SD2 (S140).

Figure 13:
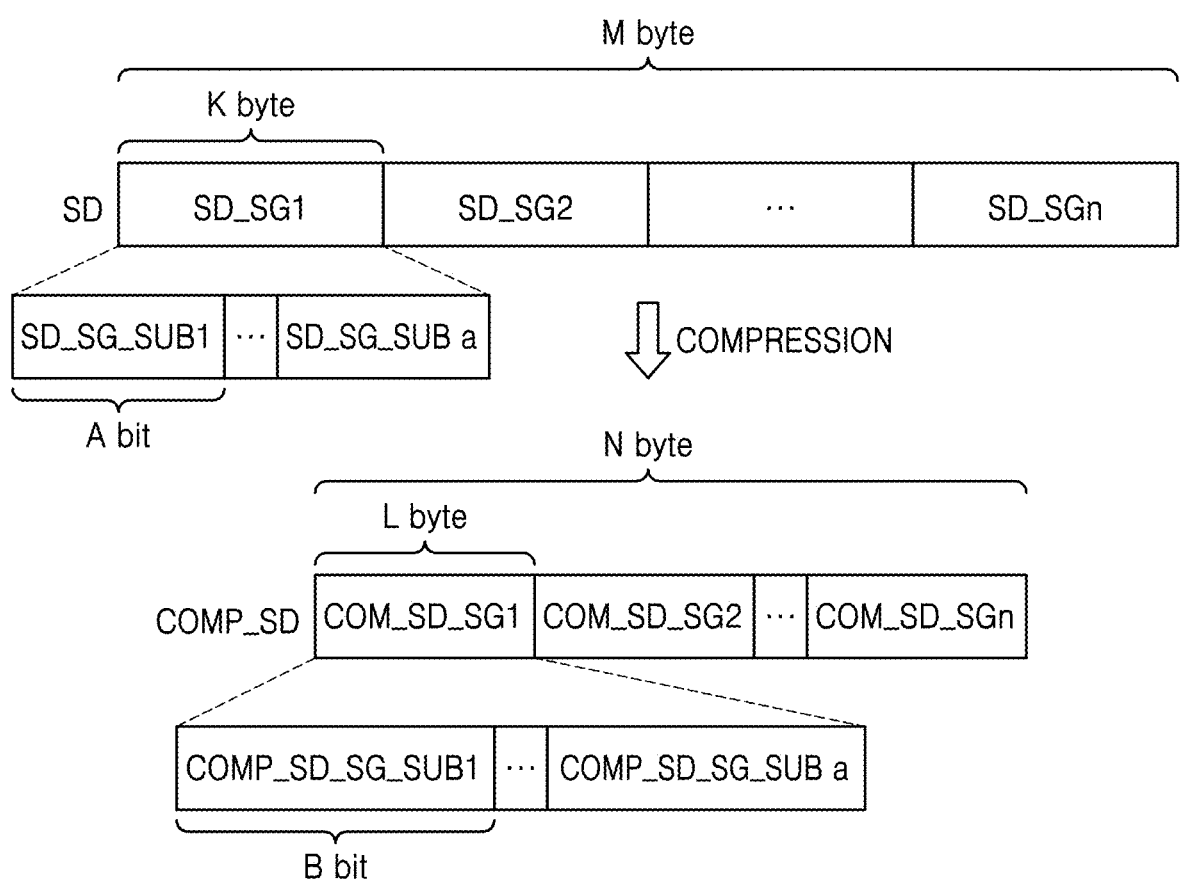
FIG. 13 is a diagram illustrating an example of a compression method of soft decision data.

FIG. 13 is a diagram illustrating an example of a compression method of soft decision data. FIG. 13 may be described with reference to FIGS. 1 and 2.

Referring to FIG. 13, the soft decision data SD may have a size of M bytes and may be divided into a plurality of soft decision segments SD_SG1 to SD_SGn. Here, M may be 16 K. The size of each of the plurality of soft decision segments SD_SG1 to SD_SGn may be K bytes that is less than M bytes. For example, K may be a multiple of 16. Each of the plurality of soft decision segments SD_SG1 to SD_SGn may be divided into a plurality of soft decision sub-segments SD_SG_SUB1 to SD_SG_SUBa. The size of each of the plurality of soft decision sub-segments SD_SG_SUB1 to SD_SG_SUBa may be A bits that is less than K bytes. For example, A may be 128.

The compressed data COMP_SD may have a size of N bytes that is less than M bytes and may be divided into a plurality of compressed segments COMP_SD_SG1 to COMP_SD_SGn. The size of each of the plurality of compressed segments COMP_SD_SG1 to COMP_SD_SGn may be L bytes that is less than K bytes. Each of N and L may be a fixed value regardless of the degree of compression. Each of N and L may be a fixed value regardless of the number of bits each indicating the minor value (for example, "1") in the soft decision data SD. Each of the plurality of compressed segments COMP_SD_SG1 to COMP_SD_SGn may be divided into a plurality of compressed sub-segments COMP_SD_SG_SUB1 to COMP_SD_SG_SUBa. The plurality of soft decision sub-segments SD_SG_SUB1 to SD_SG_SUBa may be respectively compressed into the plurality of compressed sub-segments COMP_SD_SG_SUB1 to COMP_SD_SG_SUBa. The size of each of the plurality of compressed sub-segments COMP_SD_SG_SUB1 to COMP_SD_SG_SUBa may be B bits that is less than L bytes. For example, B may be 32.

Herein, although it is described that a soft decision sub-segment (that is, SD_SG_SUB1 to SD_SG_SUBa) with 128 bits is compressed into a compressed sub-segment (that is, COMP_SD_SG_SUB1 to COMP_SD_SG_SUBa) with 32 bits, implementations of the present disclosure are not limited thereto.

The compression circuit 107 may generate the plurality of compressed segments COMP_SD_SG1 to COMP_SD_SGn by compressing the plurality of soft decision segments SD_SG1 to SD_SGn, respectively. Specifically, the compression circuit 107 may read one of the plurality of soft decision segments SD_SG1 to SD_SGn and may generate the plurality of compressed sub-segments COMP_SD_SG_SUB1 to COMP_SD_SG_SUBa by encoding the positions of bits indicating the minor value in the plurality of soft decision sub-segments SD_SG_SUB1 to SD_SG_SUBa, which are included in the read soft decision segment. A compression method of a soft decision sub-segment may be described below in detail with reference to FIGS. 14A to 16C.

Figure 14A:
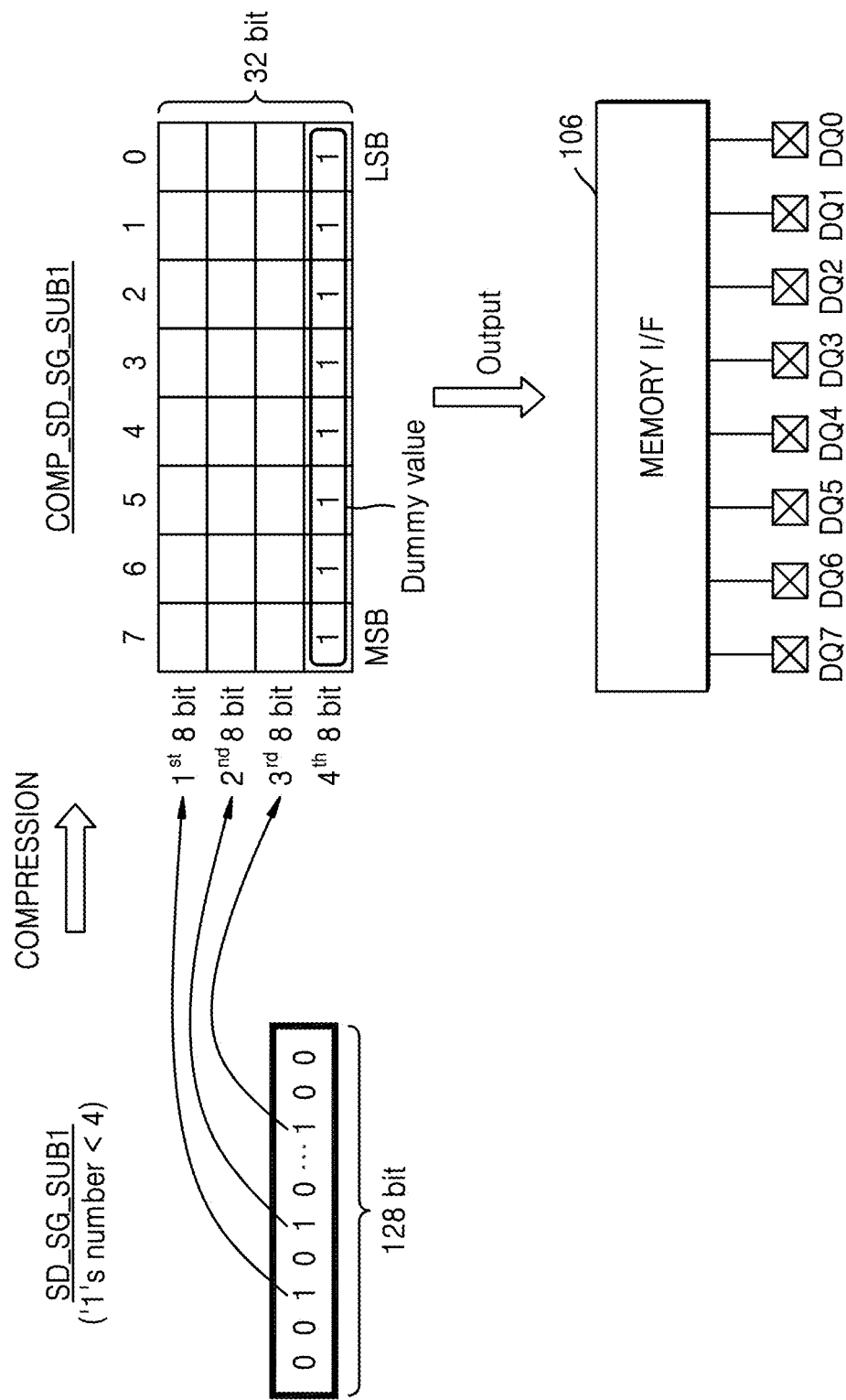
FIGS. 14A to 14C are diagrams illustrating an example of a compression method of a soft decision sub-segment.
Figure 14B:
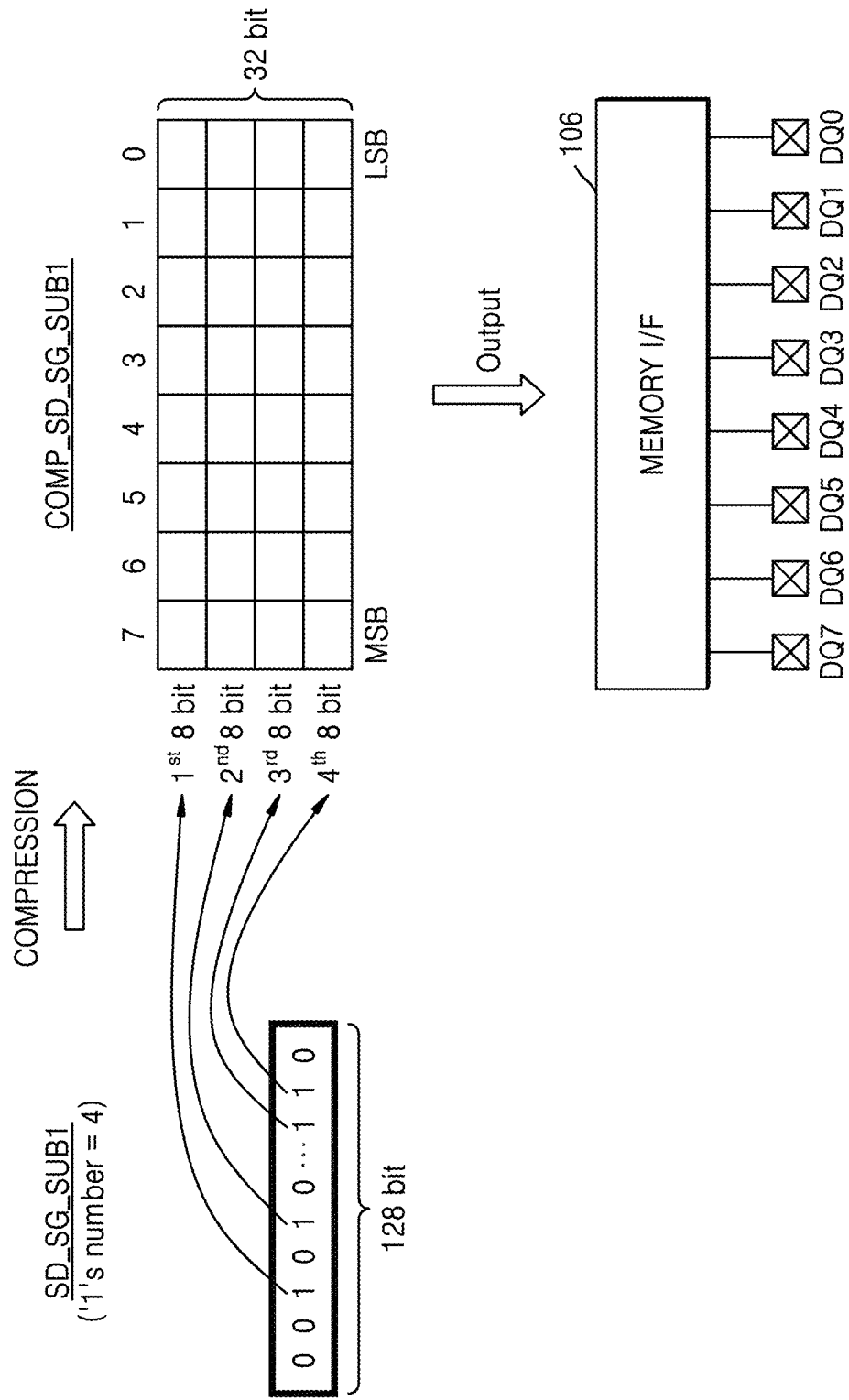
Figure 14C:
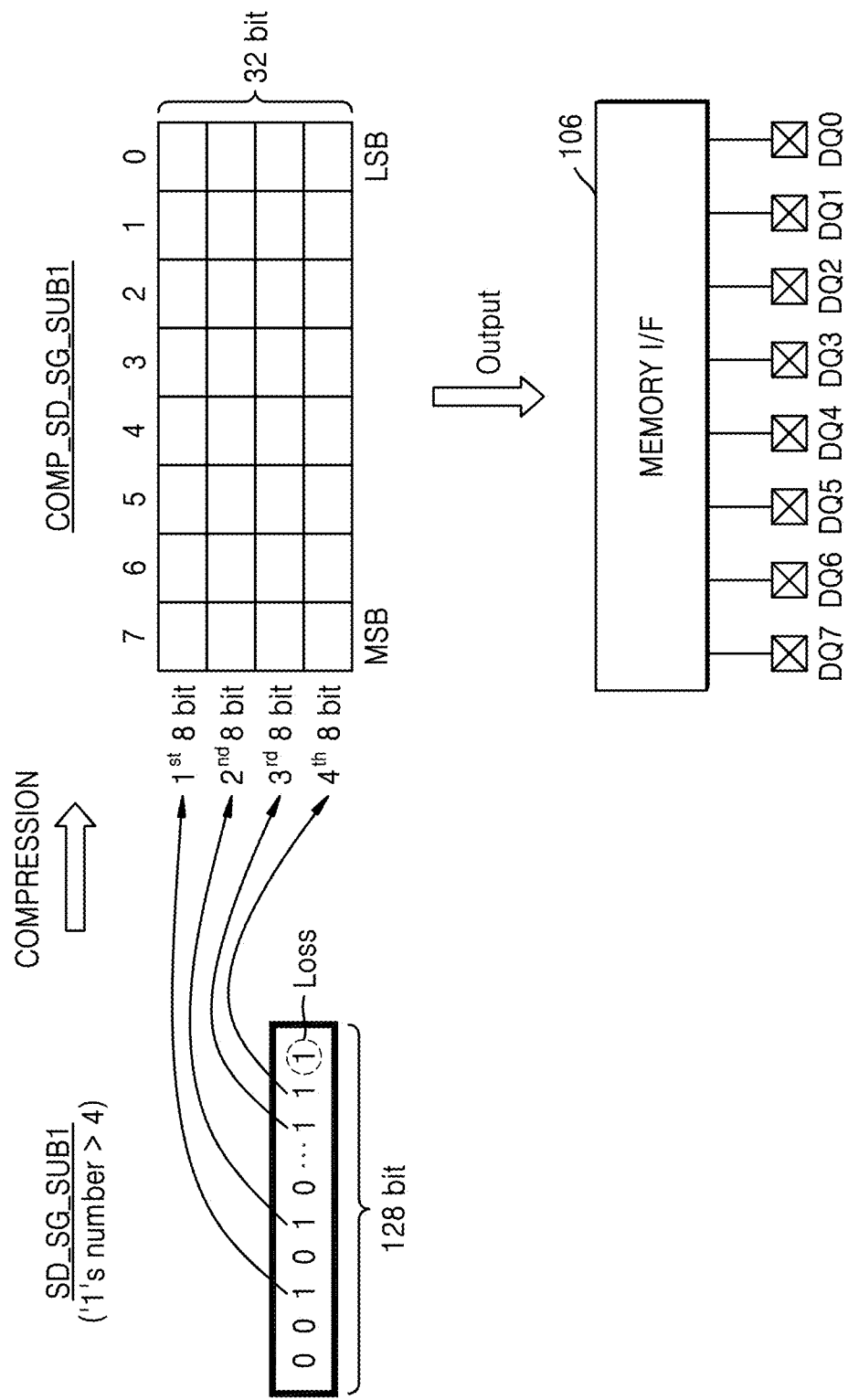

FIGS. 14A to 14C are diagrams illustrating an example of a compression method of a soft decision sub-segment. FIGS. 14A to 14C may be described with reference to FIGS. 1, 2, and 13.

Referring to FIG. 14, the compression circuit 107 may compress the soft decision sub-segment SD_SG_SUB1 with 128 bits into the compressed sub-segment COMP_SD_SG_SUB1 with 32 bits. The description regarding the soft decision sub-segment SD_SG_SUB1 may also be applied to the other soft decision sub-segments SD_SG_SUB2 to SD_SG_SUBa. The description regarding the compressed sub-segment COMP_SD_SG_SUB1 may also be applied to the other compressed sub-segments COMP_SD_SG_SUB2 to COMP_SD_SG_SUBa.

The compression circuit 107 may generate the compressed sub-segment COMP_SD_SG_SUB1 by encoding the positions of "1"s in the soft decision sub-segment SD_SG_SUB1.

In FIG. 14A, the soft decision sub-segment SD_SG_SUB1 may include three "1"s. The position of each "1" may be encoded by using 8 bits. The encoded 8-bit position values may be included in the compressed sub-segment COMP_SD_SG_SUB1. In FIG. 14A, first to third sets of 8 bits in the compressed sub-segment COMP_SD_SG_SUB1 may respectively correspond to the position values for three "1"s in the soft decision sub-segment SD_SG_SUB1.

The compression circuit 107 may fix the size of the compressed sub-segment COMP_SD_SG_SUB1 to 32 bits by including a fourth set of 8 bits having a dummy value in the compressed sub-segment COMP_SD_SG_SUB1. The dummy value may be 0xFF. Therefore, all the 8 bits indicating the dummy value may have "1". However, implementations of the present disclosure are not limited thereto, and the dummy value may have a value distinguished from the position value for any "1" in the soft decision sub-segment SD_SG_SUB1.

That is, when the number of "1"s in the compressed sub-segment COMP_SD_SG_SUB1 is less than a reference number (for example, 4), the compression circuit 107 may perform fixed-size compression by including dummy values as many as a number corresponding to the difference between the reference number and the number of position values for "1"s in the compressed sub-segment COMP_SD_SG_SUB1.

The compressed sub-segment COMP_SD_SG_SUB1 may be transferred to the memory interface circuit 330 directly or through the page buffer circuit 103. The memory interface circuit 330 may provide the compressed sub-segment COMP_SD_SG_SUB1 to the memory controller 200 through the DQ pins (that is, DQ0 to DQ7).

In FIG. 14B, the soft decision sub-segment SD_SG_SUB1 may include four "1"s. The compression circuit 107 may encode the position of each "1" by using 8 bits. The encoded 8-bit position values may be included in the compressed sub-segment COMP_SD_SG_SUB1. Therefore, in FIG. 14B, the first to fourth sets of 8 bits in the compressed sub-segment COMP_SD_SG_SUB1 may correspond to the position values for four "1"s in the soft decision sub-segment SD_SG_SUB1. That is, because the number of position values for "1"s in the compressed sub-segment COMP_SD_SG_SUB1 is equal to the reference number (for example, 4), the compression circuit 107 may generate the compressed sub-segment COMP_SD_SG_SUB1 with 32 bits by representing each of the four position values for "1"s in the compressed sub-segment COMP_SD_SG_SUB1 by 8 bits.

In FIG. 14C, the soft decision sub-segment SD_SG_SUB1 may include five "1"s. Only the position values for four "1"s from among "1"s in the soft decision sub-segment SD_SG_SUB1 may be included in the compressed sub-segment COMP_SD_SG_SUB1. That is, the position value for "1" located on the rightmost may be lost. Implementations of the present disclosure are not limited thereto, and the position value for any "1" from among the five "1"s may not be included in the compressed sub-segment COMP_SD_SG_SUB1. In some implementations, a position value to be lost may be selected based on the magnitudes of the position values for "1"s. For example, a position value with the smallest or greatest magnitude may be selected to be the position value to be lost.

In some implementations, even when "1"s as many as a number that is equal to or less than the reference number are included in the soft decision sub-segment SD_SG_SUB1, the position values for some "1"s may not be included in the compressed sub-segment COMP_SD_SG_SUB1, depending on compression methods. That is, even when "1"s as many as a number that is equal to or less than the reference number are included in the soft decision sub-segment SD_SG_SUB1, some position values may be lost.

FIG. 15 is a diagram illustrating an example of a position mapping table. FIG. 15 may be described with reference to FIG. 2.

The compression circuit 107 may compress a soft decision segment SD_SG into a compressed segment COM_SD_SG with reference to the position mapping table. Specifically, the compression circuit 107 may respectively encode "1"s in the soft decision segment SD_SG into position values with reference to the position mapping table.

The length of the soft decision segment SD_SG may be 128 bits. 8 bits that are sequentially output to the first to eighth DQ pins DQ0 to DQ7 may constitute 1 byte.

Referring to FIG. 15, when the last bit in the soft decision segment SD_SG has a value of "1", the position value for that "1" may be 0x7F, that is, 0111 1111. Therefore, the positions of the 128 bits may be encoded by using 7 bits as an index. In some implementations, the compression circuit 107 may use, as a dummy value, a different value from the position values listed in the position mapping table. For example, the compression circuit 107 may generate compressed data with a fixed size by using 0xFF, that is, 1111 1111, as the dummy value. However, implementations of the present disclosure are not limited thereto, and any one value from among 0xF0 to 0xFF may be used as the dummy value.

Figure 16A:
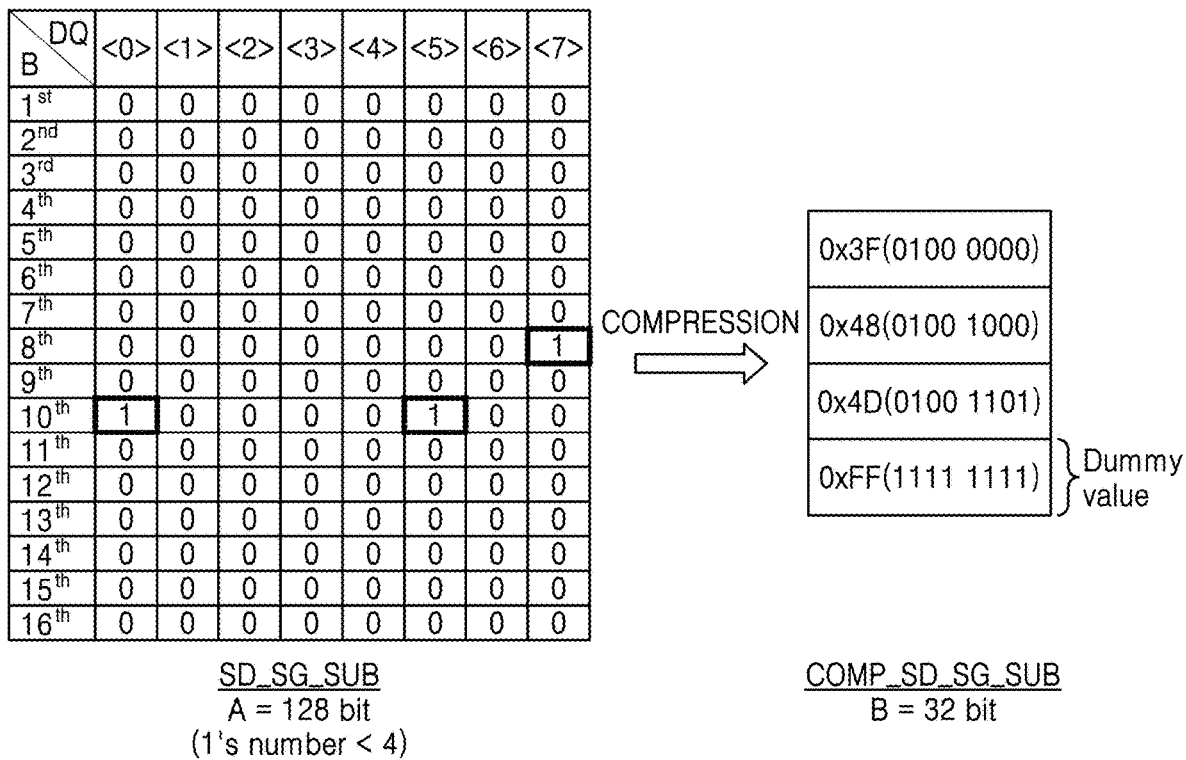
FIGS. 16A to 16C are diagrams illustrating an example of a compression method of a soft decision segment.
Figure 16B:
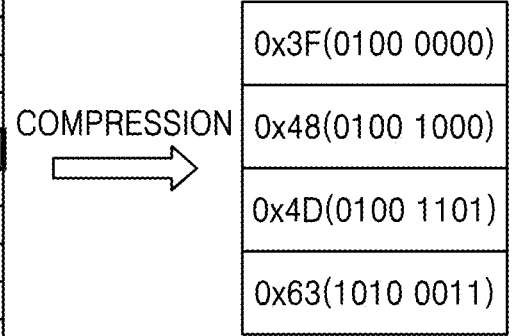
Figure 16C:
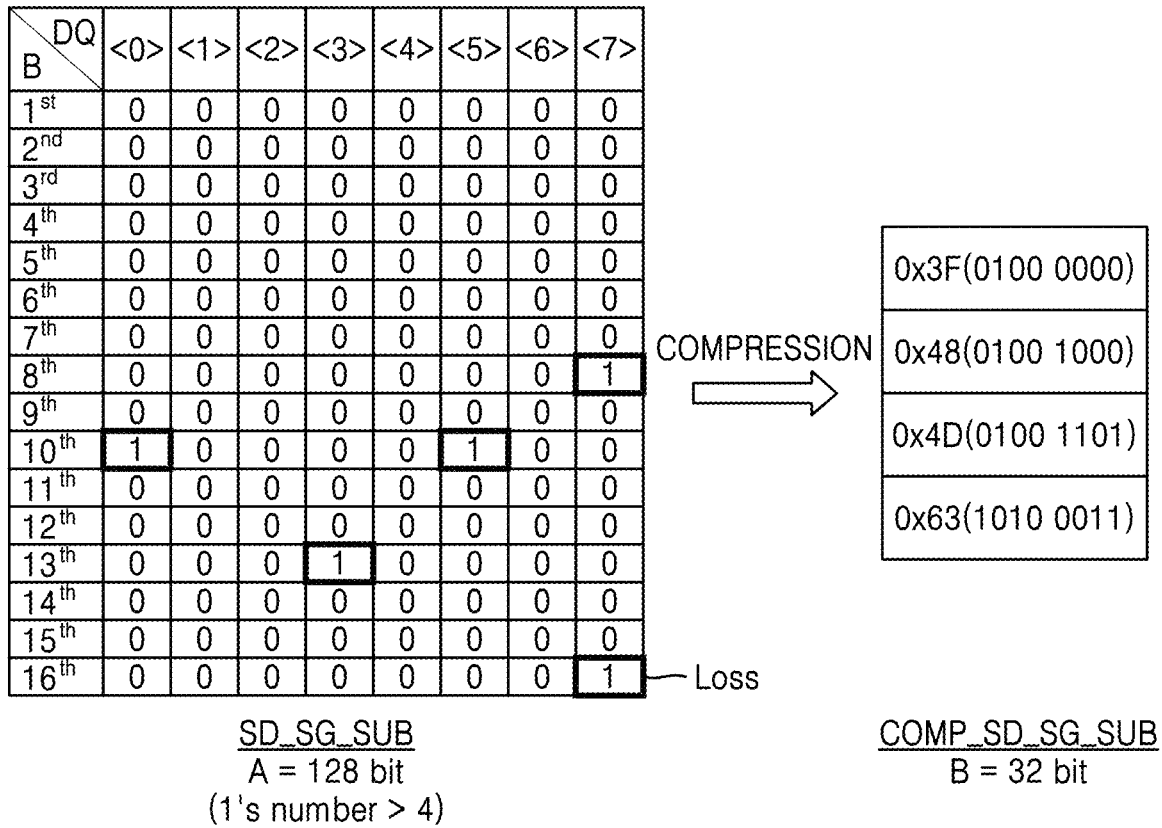

FIGS. 16A to 16C are diagrams illustrating an example of a compression method of a soft decision segment.

Referring to FIG. 16A, a soft decision sub-segment SD_SG_SUB may have 128 bits and may include three "1"s. The compression circuit 107 may generate a compressed sub-segment COMP_SD_SG_SUB based on the position mapping table of FIG. 14. Because there are three position values for "1"s and each position value is represented by using 8 bits, the three position values may be represented by 24 bits.

The compression circuit 107 may generate the compressed sub-segment COMP_SD_SG_SUB with a fixed size (that is, 32 bits) by including the three position values and an 8-bit dummy value in the compressed sub-segment COMP_SD_SG_SUB.

Referring to FIG. 16B, the soft decision sub-segment SD_SG_SUB may include four "1"s. Because there are four position values for "1"s and each position value is represented by using 8 bits, the four position values may be represented by 32 bits.

Therefore, the compression circuit 107 may generate the compressed sub-segment COMP_SD_SG_SUB with a fixed size (that is, 32 bits) by including only the four position values in the compressed sub-segment COMP_SD_SG_SUB.

Referring to FIG. 16C, the soft decision sub-segment SD_SG_SUB may include five "1"s. Because there are five position values for "1"s and each position value is represented by using 8 bits, the five position values may be represented by 40 bits.

The compression circuit 107 may generate the compressed sub-segment COMP_SD_SG_SUB with a fixed size (that is, 32 bits) by including only the position values for four "1"s from among the five "1"s in the compressed sub-segment COMP_SD_SG_SUB. Although the last "1" in FIG. 16C is lost by excluding the position value for the last "1" from the compressed sub-segment COMP_SD_SG_SUB, implementations of the present disclosure are not limited thereto, and any one "1" from among the five "1"s may be lost. In some implementations, a position value to be lost may be selected based on the magnitudes of the position values. For example, referring to FIG. 16C, in an implementation in which the greatest position value is lost, the greatest position value, 0x7F, from among the position values for "1"s may be lost. Alternatively, in an implementation in which the smallest position value is lost, the smallest position value, 0x3F, from among the position values for "1"s may be lost.

Figure 17:
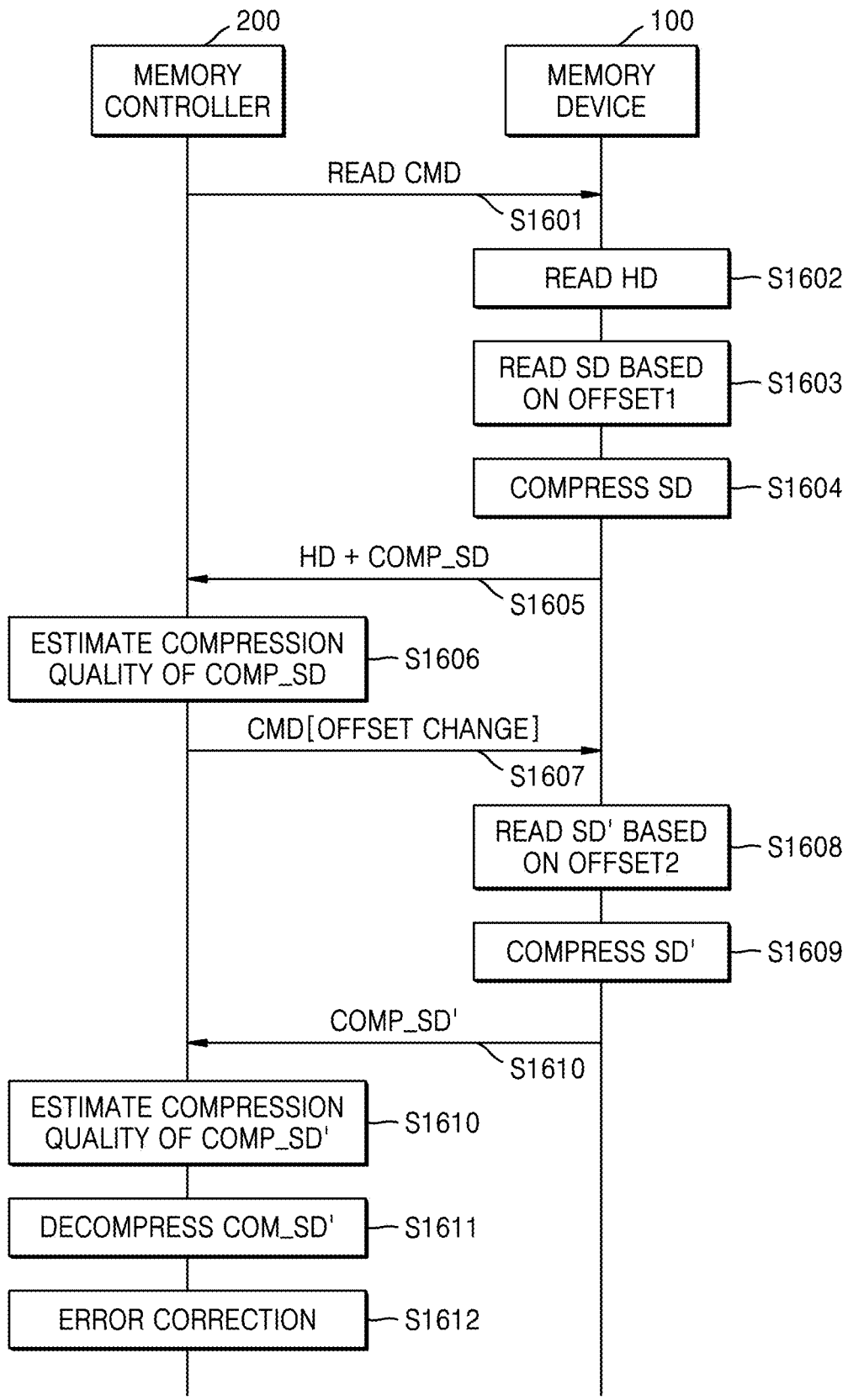
FIG. 17 is a diagram illustrating an example of a method of operating a memory system.

FIG. 17 is a diagram illustrating an example of a method of operating a memory system.

The memory controller 200 may provide a read command to the memory device 100 (S1601). The read command may be a command to request the hard decision data HD and the compressed data COMP_SD that corresponds to the soft decision data SD.

The memory device 100 may read the hard decision data HD from a memory cell array by using a hard read voltage (S1602).

The memory device 100 may read the soft decision data SD from the memory cell array, based on a first voltage offset OFFSET1 (S1603). Specifically, the memory device 100 may obtain the soft decision data SD by using a soft read voltage, which is obtained by adding the first voltage offset OFFSET1 to the hard read voltage, and a soft read voltage, which is obtained by subtracting the first voltage offset OFFSET1 from the hard read voltage.

The memory device 100 may compress the soft decision data SD (S1604). The memory device 100 may use the compression method described above with reference to FIGS. 13 to 16C.

The memory device 100 may provide the hard decision data HD and the compressed data COMP_SD to the memory controller 200 (S1605).

The memory controller 200 may estimate the compression quality of the compressed data COMP_SD (S1606).

In some implementations, the memory controller 200 may count the number of compressed sub-segments, in which the number of position values is equal to or greater than a first reference number, from among a plurality of compressed sub-segments that are included in the compressed data COMP_SD. The memory controller 200 may determine the compression quality to be bad when the counted number is equal to or greater than a second reference value and may determine the compression quality to be good when the counted number is less than the second reference value.

In some implementations, the memory controller 200 may calculate a weighted sum based on the number of position values, which are included in the plurality of compressed sub-segments, and weights. The memory controller 200 may determine the compression quality to be bad when the weighted sum is equal to or greater than a third reference value and may determine the compression quality to be good when the weighted sum is less than the third reference value.

When determining that the compression quality is bad, the memory controller 200 may provide, to the memory device 100, a command to request to change a voltage offset (S1607). The command may include information for requesting compressed data corresponding to the changed voltage offset.

Although not shown, when determining that the compression quality is good, the memory controller 200 may obtain the soft decision data SD by performing decompression on the compressed data COMP_SD and may perform error correction on the hard decision data HD based on the soft decision data SD.

The memory device 100 may change the voltage offset to a second voltage offset OFFSET2 and may read soft decision data SD', based on the second voltage offset OFFSET2 (S1608). The second voltage offset OFFSET2 may be less than the first voltage offset OFFSET1. The number of "1"s in the soft decision data SD' may be less than the number of "1"s in the soft decision data SD.

The memory device 100 may compress the soft decision data SD' (S1609). The memory device 100 may use the compression method described above with reference to FIGS. 13 to 16C.

The memory device 100 may provide compressed data COMP_SD' to the memory controller 200 (S1610).

The memory controller 200 may estimate the compression quality of the compressed data COMP_SD' (S1610). The description regarding operation S1606 may be applied to operation S1610.

When determining that the compression quality is good, the memory controller 200 may obtain the soft decision data SD' by performing decompression on the compressed data COMP_SD' (S1611).

Although not shown, when determining that the compression quality is bad, the memory controller 200 may provide, again to the memory device 100, a command to request to change the voltage offset. That is, an operation, in which the memory controller 200 provides, to the memory device 100, the command to request to change the voltage offset based on the quality of the compressed data and receives new compressed data from the memory device 100, may be repeated.

When the voltage offset converges to 0, the difference in level between a soft read voltage and a hard read voltage may be extremely small. When the soft read voltage and the hard read voltage are substantially equal to each other, because an overlap region, which may be indicated by the soft decision data, is extremely small, it may be difficult for the soft decision data to indicate the reliability of the hard decision data. Therefore, in some implementations, when the number of changes of the voltage offset is equal to or greater than a reference number, the memory controller 200 may obtain the soft decision data by performing a decompression operation on the compressed data, which is most recently received, without providing, to the memory device 100, the command to request to change the voltage offset, and may perform error correction on the hard decision data, based on the soft decision data.

The memory controller 200 may perform error correction on the hard decision data HD based on the soft decision data SD' (S1612).

Figure 18:
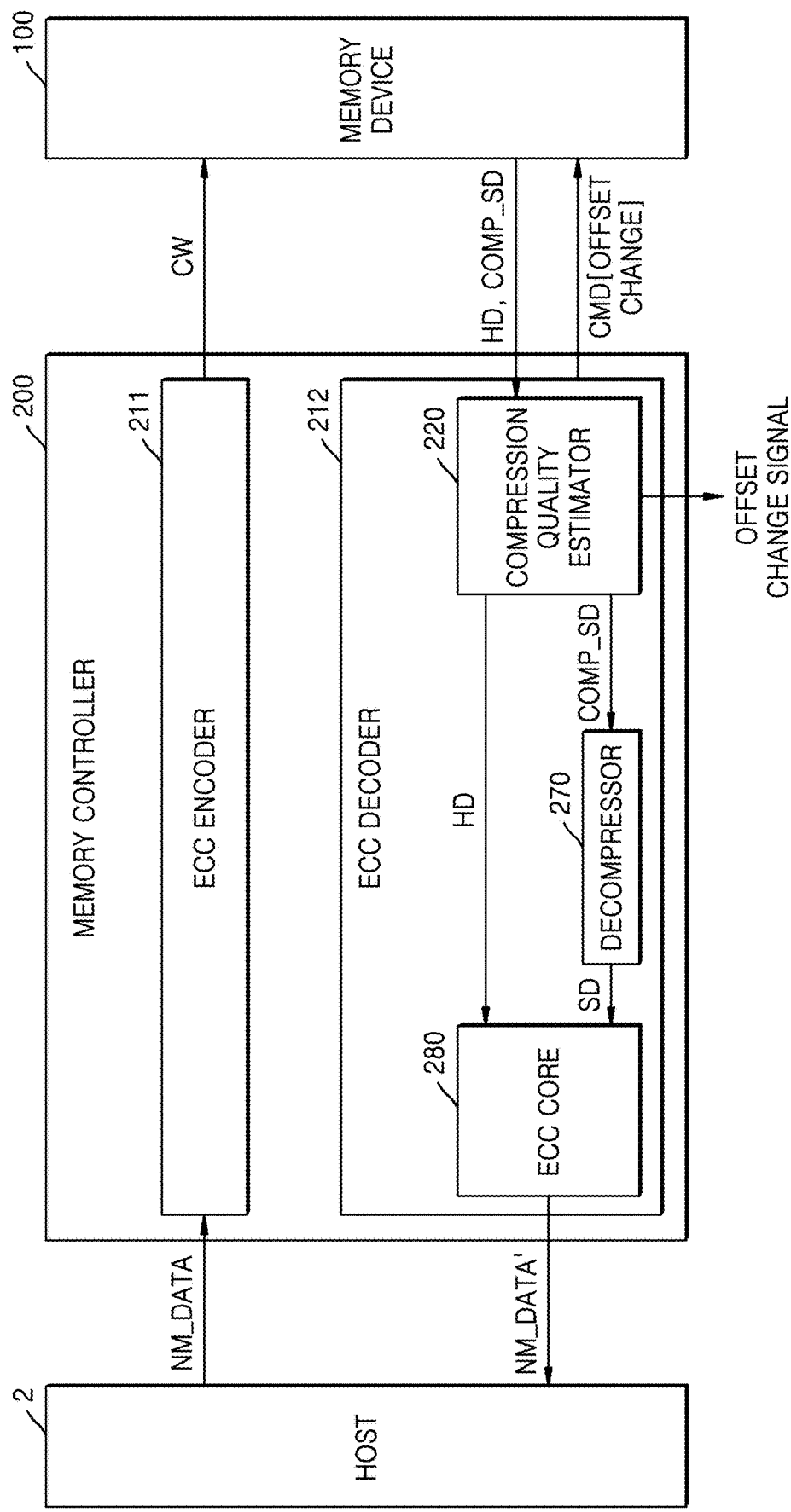
FIG. 18 is a block diagram of an example of a memory controller.

FIG. 18 is a block diagram of an example of a memory controller.

Referring to FIG. 18, the memory controller 200 may include the ECC encoder 211 and the ECC decoder 212. The ECC encoder 211 may generate a codeword CW based on normal data NM_DATA received from the host 2. Specifically, the ECC encoder 211 may generate a parity bit for the normal data NM_DATA, based on a parity generation matrix, and may generate the codeword CW including the normal data NM_DATA and the parity bit. The codeword CW may be programmed into a memory cell array in the memory device 100.

The memory device 100 may read the hard decision data HD and the soft decision data SD from a region, in which the codeword CW is stored, and may generate the compressed data COMP_SD by compressing the soft decision data SD.

The ECC decoder 212 may include the compression quality estimator 220, a decompressor 270, and an ECC core 280.

The compression quality estimator 220 may estimate the compression quality of the compressed data COMP_SD. Specifically, the compression quality estimator 220 may estimate the degree of loss of position values in the compressed data COMP_SD. For example, the compression quality estimator 220 may count the number of compressed sub-segments, in which the number of position values is equal to or greater than a first reference number, from among a plurality of compressed sub-segments in the compressed data COMP_SD, may determine the compression quality to be bad when the counted number is equal to or greater than a second reference value, and may determine the compression quality to be good when the counted number is less than the second reference value.

When determining that the compression quality of the compressed data COMP_SD is good, the compression quality estimator 220 may provide the compressed data COMP_SD to the decompressor 270. The decompressor 270 may perform a decompression operation on the compressed data COMP_SD according to the decompression method of FIG. 20.

The ECC core 280 may calculate an LLR based on the soft decision data SD and may perform error correction on the hard decision data HD by using the LLR. In some implementations, the ECC core 280 may perform error correction on the hard decision data HD, based on a parity check matrix and the hard decision data HD, without the soft decision data SD.

The ECC core 280 may generate normal data NM_DATA' by performing error correction on the hard decision data HD. The normal data NM_DATA' may be provided to the host 2.

In some implementations, when determining that the compression quality of the compressed data COMP_SD is bad, the compression quality estimator 220 may output a voltage offset change signal OFFSET CHANGE SIGNAL. The memory controller 200 may provide a command CMD to request to change a voltage offset, based on the voltage offset change signal OFFSET CHANGE SIGNAL. The memory device 100 may read soft decision data again based on the changed voltage offset and may provide compressed data of the read soft decision data to the memory controller 200.

In some implementations, when the number of changes of the voltage offset is equal to or greater than a reference number, the compression quality estimator 220 may provide the compressed data COMP_SD to the decompressor 270 without providing the command CMD to the memory device 100.

Figure 19:
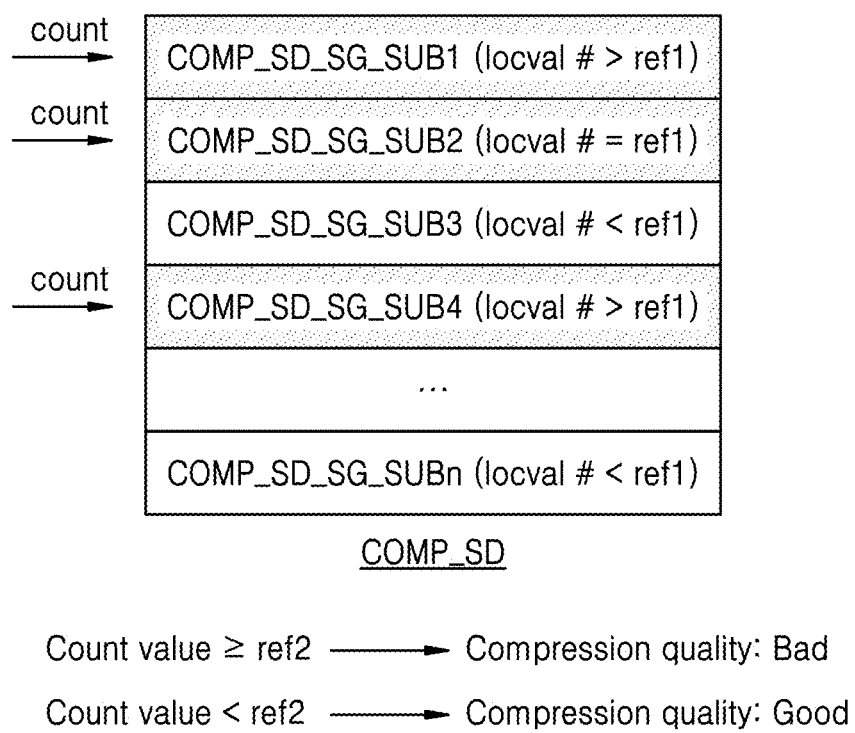
FIG. 19 is a diagram illustrating an example of a method of operating a compression quality estimator.

FIG. 19 is a diagram illustrating an example of a method of operating a compression quality estimator.

Referring to FIG. 19, the compression quality estimator 220 may count the number of compressed sub-segments, in which the number of position values (that is, locval) is equal to or greater than a first reference number (that is, ref1) from among the plurality of compressed sub-segments COMP_SD_SG_SUB1 to COMP_SD_SG_SUBn that are included in the compressed data COMP_SD.

The compression quality estimator 220 may determine the compression quality to be bad when the counted number is equal to or greater than a second reference value and may determine the compression quality to be good when the counted number is less than the second reference value.

Figure 20:
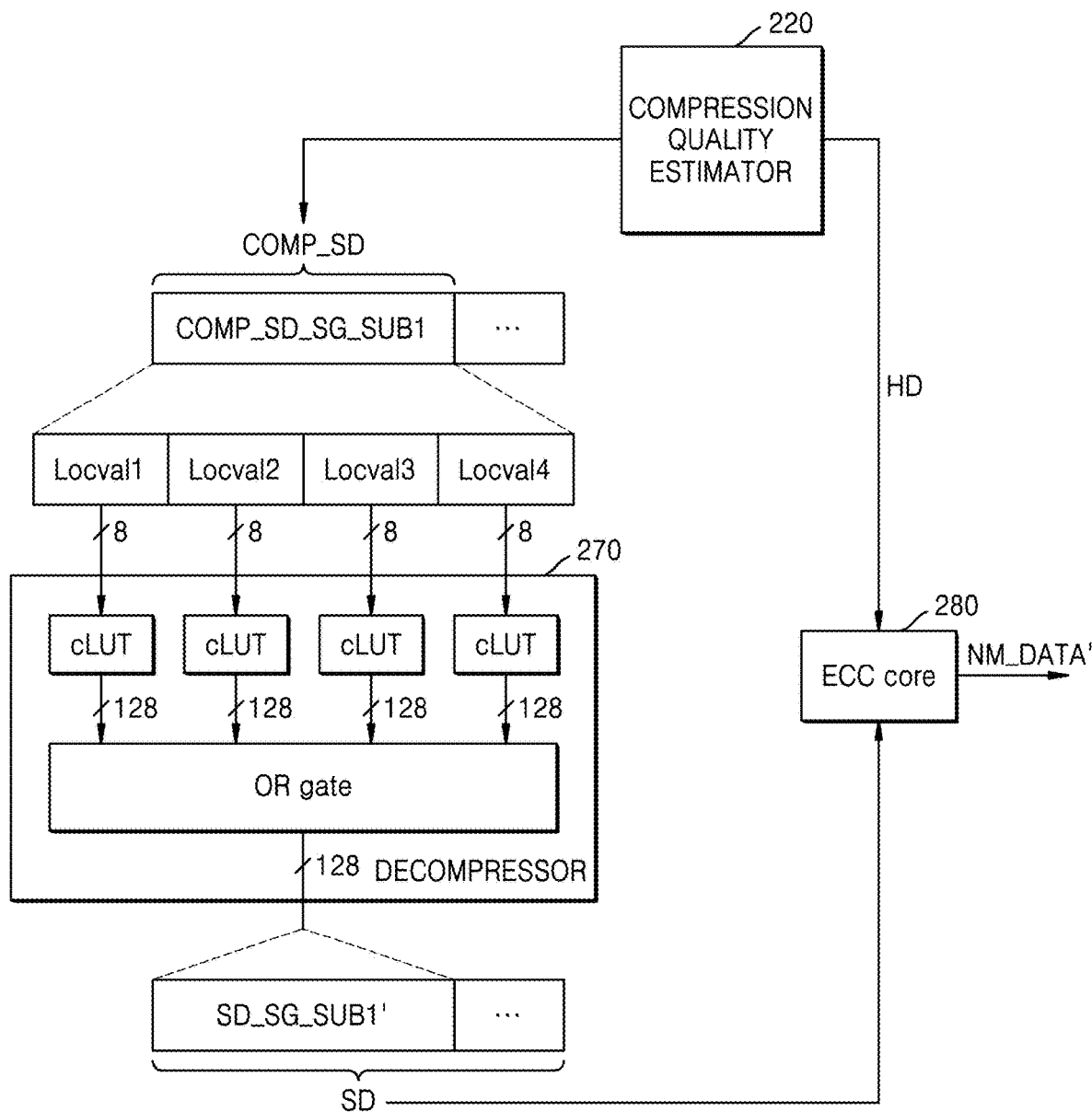
FIG. 20 is a diagram illustrating an example of a decompression method.

FIG. 20 is a diagram illustrating an example of a decompression method.

Referring to FIG. 20, the decompressor circuit 270 may receive the compressed data COMP_SD from the compression quality estimator 220.

The compressed data COMP_SD may include a plurality of compressed sub-segments including the compressed sub-segment COMP_SD_SG_SUB1. The compressed sub-segment COMP_SD_SG_SUB1 may include a plurality of position values. Referring to FIG. 20, the compressed sub-segment COMP_SD_SG_SUB1 may include first to fourth position values Locval1 to Locval4. In some implementations, the compressed sub-segment COMP_SD_SG_SUB1 may include at least one dummy value.

The decompressor circuit 270 may include a plurality of conversion circuits cLUT and an OR gate. The plurality of conversion circuits cLUT may receive the first to fourth position values Locval1 to Locval4, respectively. A conversion circuit cLUT may convert a bit indicated by a received position value, from among bits corresponding to the size (for example, 128 bits) of a soft decision sub-segment, into "1" and convert each of the remaining bits into "0", thereby generating a partial soft decision sub-segment. Because the first to fourth position values Locval1 to Locval4 are different from each other, the plurality of conversion circuits cLUT may respectively output 128-bit partial soft decision sub-segments, in which bits at different positions are respectively converted into "1"s.

The OR gate may receive the partial soft-decision sub-segments from the plurality of conversion circuits cLUT and may generate a soft decision sub-segment SD_SG_SUB1' by performing an OR operation on the received partial soft-decision sub-segments. The size of the soft decision sub-segment SD_SG_SUB1' may be 128 bits. From among the 128 bits in the soft decision sub-segment SD_SG_SUB1', bits respectively indicated by the first to fourth position values Locval1 to Locval4 may each have "1" and the remaining bits may each have "0".

In some implementations, the conversion circuit cLUT and the OR gate, which are shown in FIG. 18, may perform a decompression operation on different compressed sub-segments from the compressed sub-segment COMP_SD_SG_SUB1.

In some implementations, although not shown, the decompressor 270 may further include a conversion circuit cLUT and an OR gate, which perform a decompression operation on a different compressed sub-segment from the compressed sub-segment COMP_SD_SG_SUB1.

In FIG. 20, although the decompression of the compressed sub-segment COMP_SD_SG_SUB1 is described for convenience of description, the decompressor 270 may obtain the soft decision data SD, which is decompressed, by performing decompression on all of the compressed sub-segments that are included in the compressed data COMP_SD.

Figure 21B:
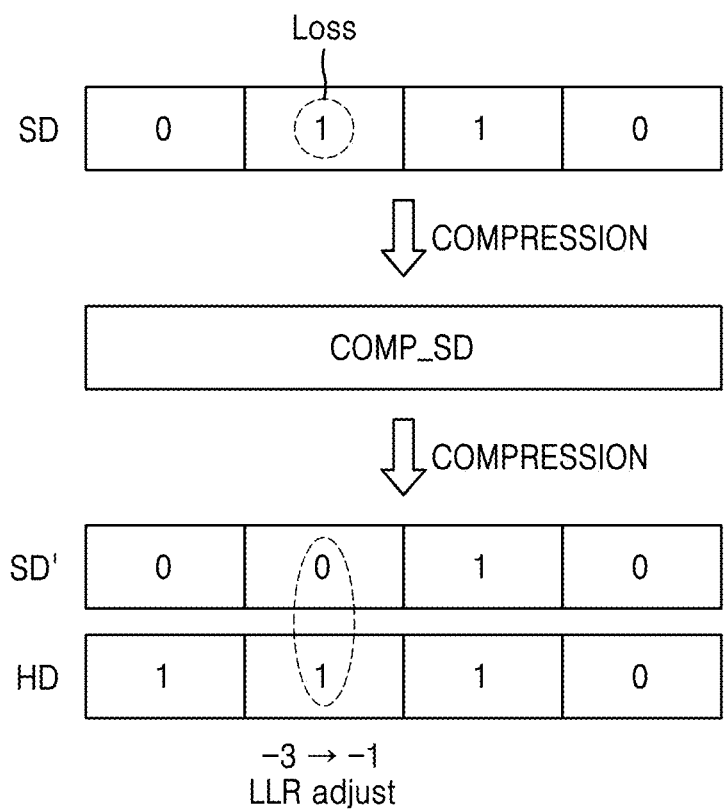

FIGS. 21A and 21B are example diagrams illustrating LLR adjustment.

Referring to FIGS. 18 and 21A, the ECC core 280 may calculate an LLR value based on an LLR mapping table. Specifically, the hard decision data HD may determine the sign of the LLR value, and the soft decision data SD may determine the absolute value of the LLR value. For example, the sign of the LLR value corresponding to "1" in the hard decision data HD may be –, and the sign of the LLR value corresponding to "O" in the hard decision data HD may be +. The absolute value of the LLR value corresponding to "1" in the soft decision data SD may be 1, and the absolute value of the LLR value corresponding to "0" in the soft decision data SD may be 3. However, implementations of the present disclosure are not limited thereto.

The ECC core 280 may calculate an LLR value and may perform error correction on the hard decision data HD, based on the calculated LLR value.

Referring to FIG. 21B, after the soft decision data SD is compressed into the compressed data COMP_SD, when the compressed data COMP_SD is decompressed to the soft decision data SD', some "1"s may be lost. Therefore, an error bit may be included in the soft decision data SD'. Because the ECC core 280 performs LLR mapping based on the soft decision data SD', an error may occur in the LLR mapping.

Therefore, when the compression quality is bad, the ECC core 280 may perform LLR adjustment. Specifically, the ECC core 280 may respectively change some "0"s in the soft decision data SD' to "1"s and may perform LLR mapping based on the changed bits.

In the example of FIG. 21B, although the LLR value is –3 when the softa decision data SD' is 0 and the hard decision data HD is 1, the ECC core 280 may change the LLR value to –1 through the LLR adjustment.

Figure 22:
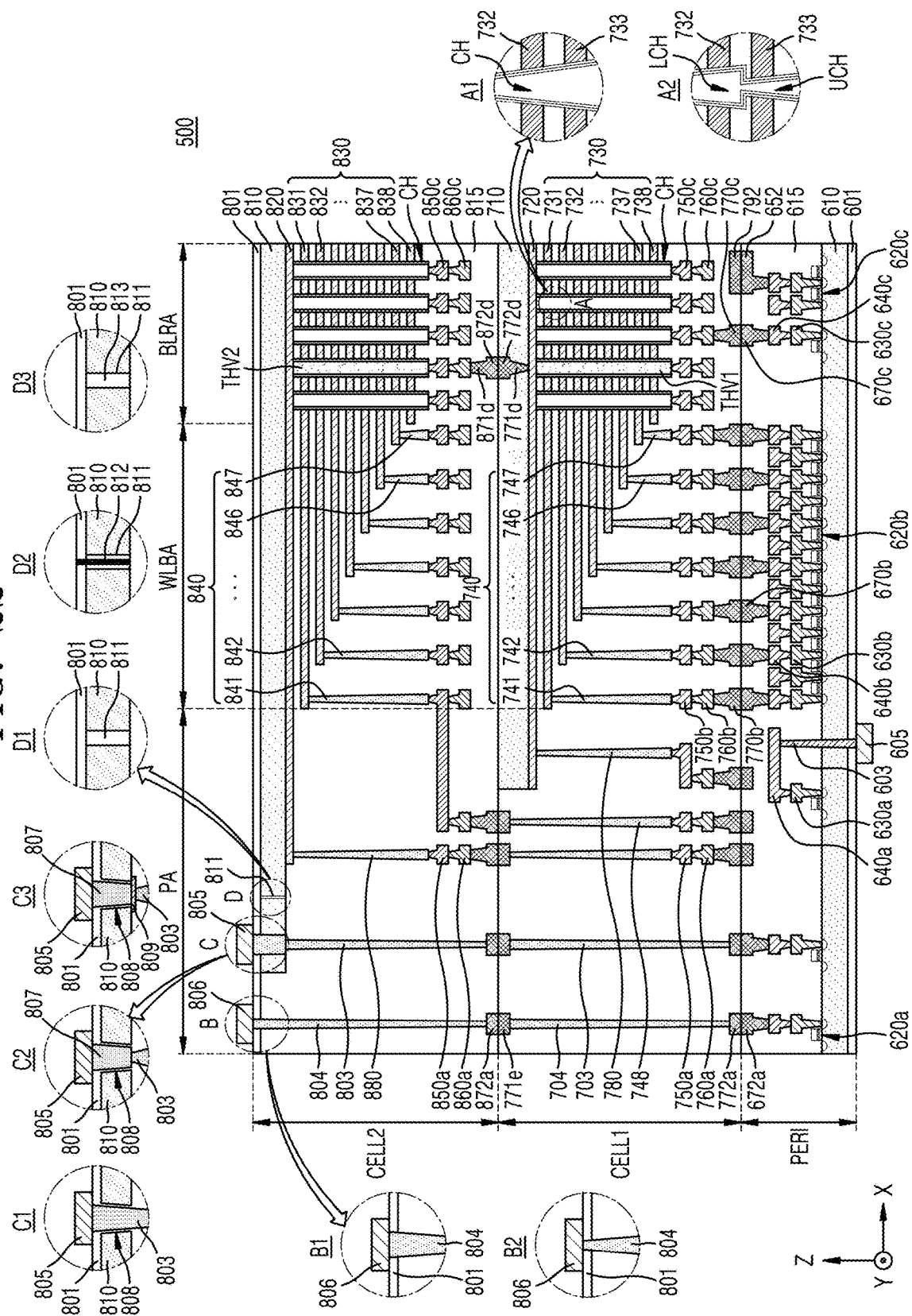
FIG. 22 is a diagram illustrating an example of a memory device.

FIG. 22 is a diagram illustrating an example of a memory device 500.

Referring to FIG. 22, the memory device 500 may have a chip-to-chip (C2C) structure. At least one upper chip including a cell region and a lower chip including a peripheral circuit region PER1 may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 500 may include the at least one upper chip including the cell region. For example, as illustrated in FIG. 22, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PER1 may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a -Z-axis direction in FIG. 22. However, implementations of the present disclosures are not limited thereto. In some implementations, one of the first upper chip and the second upper chip may be turned over and then may be connected to a corresponding chip by the bonding method.

Each of the peripheral circuit region PER1 and the first and second cell regions CELL1 and CELL2 of the memory device 500 may include an external pad bonding region PA, a word line bonding region WLBA, and a bit line bonding region BLBA.

The peripheral circuit region PER1 may include a first substrate 610 and a plurality of circuit elements 620a, 620b and 620c formed on the first substrate 610. An interlayer insulating layer 615 including one or more insulating layers may be provided on the plurality of circuit elements 620a, 620b and 620c, and a plurality of metal lines electrically connected to the plurality of circuit elements 620a, 620b and 620c may be provided in the interlayer insulating layer 615. For example, the plurality of metal lines may include first metal lines 630a, 630b and 630c connected to the plurality of circuit elements 620a, 620b and 620c, and second metal lines 640a, 640b and 640c formed on the first metal lines 630a, 630b and 630c. The plurality of metal lines may be formed of at least one of various conductive materials. For example, the first metal lines 630a, 630b and 630c may be formed of tungsten having a relatively high electrical resistivity, and the second metal lines 640a, 640b and 640c may be formed of copper having a relatively low electrical resistivity.

The first metal lines 630a, 630b and 630c and the second metal lines 640a, 640b and 640c are illustrated and described in the present implementations. However, implementations of the present disclosures are not limited thereto. In some implementations, at least one or more additional metal lines may further be formed on the second metal lines 640a, 640b and 640c. In this case, the second metal lines 640a, 640b and 640c may be formed of aluminum, and at least some of the additional metal lines formed on the second metal lines 640a, 640b and 640c may be formed of copper having an electrical resistivity lower than that of aluminum of the second metal lines 640a, 640b and 640c.

The interlayer insulating layer 615 may be disposed on the first substrate 610 and may include an insulating material such as silicon oxide and/or silicon nitride.

Each of the first and second cell regions CELL1 and CELL2 may include at least one memory block. The first cell region CELL1 may include a second substrate 710 and a common source line 720. A plurality of word lines 730 (731 to 738) may be stacked on the second substrate 710 in a direction (i.e., the Z-axis direction) perpendicular to a top surface of the second substrate 710. String selection lines and a ground selection line may be disposed on and under the word lines 730, and the plurality of word lines 730 may be disposed between the string selection lines and the ground selection line. Likewise, the second cell region CELL2 may include a third substrate 810 and a common source line 820, and a plurality of word lines 830 (831 to 838) may be stacked on the third substrate 810 in a direction (i.e., the Z-axis direction) perpendicular to a top surface of the third substrate 810. Each of the second substrate 710 and the third substrate 810 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some implementations, as illustrated in a region 'A1', the channel structure CH may be provided in the bit line bonding region BLBA and may extend in the direction perpendicular to the top surface of the second substrate 710 to penetrate the word lines 730, the string selection lines, and the ground selection line. The channel structure CH may include a data storage layer, a channel layer, and a filling insulation layer. The channel layer may be electrically connected to a first metal line 750c and a second metal line 760c in the bit line bonding region BLBA. For example, the second metal line 760c may be a bit line and may be connected to the channel structure CH through the first metal line 750c. The bit line 760c may extend in a first direction (e.g., a Y-axis direction) parallel to the top surface of the second substrate 710.

In some implementations, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 710 to penetrate the common source line 720 and lower word lines 731 and 732. The lower channel LCH may include a data storage layer, a channel layer, and a filling insulation layer and may be connected to the upper channel UCH. The upper channel UCH may penetrate upper word lines 733 to 738. The upper channel UCH may include a data storage layer, a channel layer, and a filling insulation layer, and the channel layer of the upper channel UCH may be electrically connected to the first metal line 750c and the second metal line 760c. As a length of a channel increases, due to characteristics of manufacturing processes, it may be difficult to form a channel having a substantially uniform width. The memory device 500 according to the present implementations may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 732 and 733 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 731 and 732 penetrated by the lower channel LCH is less than the number of the upper word lines 733 to 738 penetrated by the upper channel UCH in the region 'A2'. However, implementations of the present disclosures are not limited thereto. In some implementations, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 22, the first through-electrode THV1 may penetrate the common source line 720 and the plurality of word lines 730. In some implementations, the first through-electrode THV1 may further penetrate the second substrate 710. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some implementations, the first through-electrode THV1 and the second through-electrode THV2 may be electrically connected to each other through a first through-metal pattern 772*d* and a second through-metal pattern 872*d*. The first through-metal pattern 772*d* may be formed at a bottom end of the first upper chip including the first cell region CELL1, and the second through-metal pattern 872*d* may be formed at a top end of the second upper chip including the second cell region CELL2. The first through-electrode THV1 may be electrically connected to the first metal line 750*c* and the second metal line 760*c*. A lower via 771*d* may be formed between the first through-electrode THV1 and the first through-metal pattern 772*d*, and an upper via 871*d* may be formed between the second through-electrode THV2 and the second through-metal pattern 872*d*. The first through-metal pattern 772*d* and the second through-metal pattern 872*d* may be connected to each other by the bonding method.

In addition, in the bit line bonding region BLBA, an upper metal pattern 652 may be formed in an uppermost metal layer of the peripheral circuit region PER1, and an upper metal pattern 792 having the same shape as the upper metal pattern 652 may be formed in an uppermost metal layer of the first cell region CELL1. The upper metal pattern 792 of the first cell region CELL1 and the upper metal pattern 652 of the peripheral circuit region PER1 may be electrically connected to each other by the bonding method. In the bit line bonding region BLBA, the bit line 760*c* may be electrically connected to a page buffer included in the peripheral circuit region PER1. For example, some of the circuit elements 620*c* of the peripheral circuit region PER1 may constitute the page buffer, and the bit line 760*c* may be electrically connected to the circuit elements 620*c* constituting the page buffer through an upper bonding metal pattern 770*c* of the first cell region CELL1 and an upper bonding metal pattern 670*c* of the peripheral circuit region PER1.

Referring continuously to FIG. 22, in the word line bonding region WLBA, the word lines 730 of the first cell region CELL1 may extend in a second direction (e.g., an X-axis direction) parallel to the top surface of the second substrate 710 and may be connected to a plurality of cell contact plugs 740 (741 to 747). First metal lines 750*b* and second metal lines 760*b* may be sequentially connected onto the cell contact plugs 740 connected to the word lines 730. In the word line bonding region WLBA, the cell contact plugs 740 may be connected to the peripheral circuit region PER1 through upper bonding metal patterns 770*b* of the first cell region CELL1 and upper bonding metal patterns 670*b* of the peripheral circuit region PER1.

The cell contact plugs 740 may be electrically connected to a row decoder included in the peripheral circuit region PER1. For example, some of the circuit elements 620*b* of the peripheral circuit region PER1 may constitute the row decoder, and the cell contact plugs 740 may be electrically connected to the circuit elements 620*b* constituting the row decoder through the upper bonding metal patterns 770*b* of the first cell region CELL1 and the upper bonding metal patterns 670*b* of the peripheral circuit region PER1. In some implementations, an operating voltage of the circuit elements 620*b* constituting the row decoder may be different from an operating voltage of the circuit elements 620*c* constituting the page buffer. For example, the operating voltage of the circuit elements 620*c* constituting the page buffer may be greater than the operating voltage of the circuit elements 620*b* constituting the row decoder.

Likewise, in the word line bonding region WLBA, the word lines 830 of the second cell region CELL2 may extend in the second direction (e.g., the X-axis direction) parallel to the top surface of the third substrate 810 and may be connected to a plurality of cell contact plugs 840 (841 to 847). The cell contact plugs 840 may be connected to the peripheral circuit region PER1 through an upper metal pattern of the second cell region CELL2 and lower and upper metal patterns and a cell contact plug 348 of the first cell region CELL1.

In the word line bonding region WLBA, the upper bonding metal patterns 770*b* may be formed in the first cell region CELL1, and the upper bonding metal patterns 670*b* may be formed in the peripheral circuit region PER1. The upper bonding metal patterns 770*b* of the first cell region CELL1 and the upper bonding metal patterns 670*b* of the peripheral circuit region PER1 may be electrically connected to each other by the bonding method. The upper bonding metal patterns 770*b* and the upper bonding metal patterns 670*b* may be formed of aluminum, copper, or tungsten.

In the external pad bonding region PA, a lower metal pattern 771*e* may be formed in a lower portion of the first cell region CELL1, and an upper metal pattern 872*a* may be formed in an upper portion of the second cell region CELL2. The lower metal pattern 771*e* of the first cell region CELL1 and the upper metal pattern 872*a* of the second cell region CELL2 may be connected to each other by the bonding method in the external pad bonding region PA. Likewise, an upper metal pattern 772a may be formed in an upper portion of the first cell region CELL1, and an upper metal pattern 672a may be formed in an upper portion of the peripheral circuit region PER1. The upper metal pattern 772a of the first cell region CELL1 and the upper metal pattern 672a of the peripheral circuit region PER1 may be connected to each other by the bonding method.

Common source line contact plugs 780 and 880 may be disposed in the external pad bonding region PA. The common source line contact plugs 780 and 880 may be formed of a conductive material such as a metal, a metal compound, and/or doped polysilicon. The common source line contact plug 780 of the first cell region CELL1 may be electrically connected to the common source line 720, and the common source line contact plug 880 of the second cell region CELL2 may be electrically connected to the common source line 820. A first metal line 750a and a second metal line 760a may be sequentially stacked on the common source line contact plug 780 of the first cell region CELL1, and a first metal line 850a and a second metal line 860a may be sequentially stacked on the common source line contact plug 880 of the second cell region CELL2.

Input/output pads 605, 805 and 806 may be disposed in the external pad bonding region PA. Referring to FIG. 22, a lower insulating layer 611 may cover a bottom surface of the first substrate 610, and a first input/output pad 605 may be formed on the lower insulating layer 611. The first input/output pad 605 may be connected to at least one of a plurality of the circuit elements 620a disposed in the peripheral circuit region PER1 through a first input/output contact plug 603 and may be separated from the first substrate 610 by the lower insulating layer 611. In addition, a side insulating layer may be disposed between the first input/output contact plug 603 and the first substrate 610 to electrically isolate the first input/output contact plug 603 from the first substrate 610.

An upper insulating layer 801 covering a top surface of the third substrate 810 may be formed on the third substrate 810. A second input/output pad 805 and/or a third input/output pad 806 may be disposed on the upper insulating layer 801. The second input/output pad 805 may be connected to at least one of the plurality of circuit elements 620a disposed in the peripheral circuit region PER1 through second input/output contact plugs 803 and 703, and the third input/output pad 806 may be connected to at least one of the plurality of circuit elements 620a disposed in the peripheral circuit region PER1 through third input/output contact plugs 804 and 704.

In some implementations, the third substrate 810 may not be disposed in a region in which the input/output contact plug is disposed. For example, as illustrated in a region 'B', the third input/output contact plug 804 may be separated from the third substrate 810 in a direction parallel to the top surface of the third substrate 810 and may penetrate an interlayer insulating layer 815 of the second cell region CELL2 so as to be connected to the third input/output pad 806. In this case, the third input/output contact plug 804 may be formed by at least one of various processes.

In some implementations, as illustrated in a region 'B1', the third input/output contact plug 804 may extend in a third direction (e.g., the Z-axis direction), and a diameter of the third input/output contact plug 804 may become progressively greater toward the upper insulating layer 801. In other words, a diameter of the channel structure CH described in the region 'A1' may become progressively less toward the upper insulating layer 801, but the diameter of the third input/output contact plug 804 may become progressively greater toward the upper insulating layer 801. For example, the third input/output contact plug 804 may be formed after the second cell region CELL2 and the first cell region CELL1 are bonded to each other by the bonding method.

In some implementations, as illustrated in a region 'B2', the third input/output contact plug 804 may extend in the third direction (e.g., the Z-axis direction), and a diameter of the third input/output contact plug 804 may become progressively less toward the upper insulating layer 801. In other words, like the channel structure CH, the diameter of the third input/output contact plug 804 may become progressively less toward the upper insulating layer 801. For example, the third input/output contact plug 804 may be formed together with the cell contact plugs 840 before the second cell region CELL2 and the first cell region CELL1 are bonded to each other.

In some implementations, the input/output contact plug may overlap with the third substrate 810. For example, as illustrated in a region 'C', the second input/output contact plug 803 may penetrate the interlayer insulating layer 815 of the second cell region CELL2 in the third direction (e.g., the Z-axis direction) and may be electrically connected to the second input/output pad 805 through the third substrate 810. In this case, a connection structure of the second input/output contact plug 803 and the second input/output pad 805 may be realized by various methods.

In some implementations, as illustrated in a region 'C1', an opening 808 may be formed to penetrate the third substrate 810, and the second input/output contact plug 803 may be connected directly to the second input/output pad 805 through the opening 808 formed in the third substrate 810. In this case, as illustrated in the region 'C1', a diameter of the second input/output contact plug 803 may become progressively greater toward the second input/output pad 805. However, implementations of the present disclosures are not limited thereto, and in some implementations, the diameter of the second input/output contact plug 803 may become progressively less toward the second input/output pad 805.

In some implementations, as illustrated in a region 'C2', the opening 808 penetrating the third substrate 810 may be formed, and a contact 807 may be formed in the opening 808. An end of the contact 807 may be connected to the second input/output pad 805, and another end of the contact 807 may be connected to the second input/output contact plug 803. Thus, the second input/output contact plug 803 may be electrically connected to the second input/output pad 805 through the contact 807 in the opening 808. In this case, as illustrated in the region 'C2', a diameter of the contact 807 may become progressively greater toward the second input/output pad 805, and a diameter of the second input/output contact plug 803 may become progressively less toward the second input/output pad 805. For example, the second input/output contact plug 803 may be formed together with the cell contact plugs 840 before the second cell region CELL2 and the first cell region CELL1 are bonded to each other, and the contact 807 may be formed after the second cell region CELL2 and the first cell region CELL1 are bonded to each other.

In some implementations illustrated in a region 'C3', a stopper 809 may further be formed on a bottom end of the opening 808 of the third substrate 810, as compared with the implementations of the region 'C2'. The stopper 809 may be a metal line formed in the same layer as the common source line 820. Alternatively, the stopper 809 may be a metal line formed in the same layer as at least one of the word lines 830. The second input/output contact plug 803 may be electrically connected to the second input/output pad 805 through the contact 807 and the stopper 809.

Like the second and third input/output contact plugs 803 and 804 of the second cell region CELL2, a diameter of each of the second and third input/output contact plugs 703 and 704 of the first cell region CELL1 may become progressively less toward the lower metal pattern 771e or may become progressively greater toward the lower metal pattern 771e.

Meanwhile, in some implementations, a slit 811 may be formed in the third substrate 810. For example, the slit 811 may be formed at a certain position of the external pad bonding region PA. For example, as illustrated in a region 'D', the slit 811 may be located between the second input/output pad 805 and the cell contact plugs 840 when viewed in a plan view. Alternatively, the second input/output pad 805 may be located between the slit 811 and the cell contact plugs 840 when viewed in a plan view.

In some implementations, as illustrated in a region 'D1', the slit 811 may be formed to penetrate the third substrate 810. For example, the slit 811 may be used to prevent the third substrate 810 from being finely cracked when the opening 808 is formed. However, implementations of the present disclosures are not limited thereto, and in some implementations, the slit 811 may be formed to have a depth ranging from about 60% to about 70% of a thickness of the third substrate 810.

In some implementations, as illustrated in a region 'D2', a conductive material 812 may be formed in the slit 811. For example, the conductive material 812 may be used to discharge a leakage current occurring in driving of the circuit elements in the external pad bonding region PA to the outside. In this case, the conductive material 812 may be connected to an external ground line.

In some implementations, as illustrated in a region 'D3', an insulating material 813 may be formed in the slit 811. For example, the insulating material 813 may be used to electrically isolate the second input/output pad 805 and the second input/output contact plug 803 disposed in the external pad bonding region PA from the word line bonding region WLBA. Since the insulating material 813 is formed in the slit 811, it is possible to prevent a voltage provided through the second input/output pad 805 from affecting a metal layer disposed on the third substrate 810 in the word line bonding region WLBA.

Meanwhile, in some implementations, the first to third input/output pads 605, 805 and 806 may be selectively formed. For example, the memory device 500 may be realized to include only the first input/output pad 605 disposed on the first substrate 610, to include only the second input/output pad 805 disposed on the third substrate 810, or to include only the third input/output pad 806 disposed on the upper insulating layer 801.

In some implementations, at least one of the second substrate 710 of the first cell region CELL1 or the third substrate 810 of the second cell region CELL2 may be used as a sacrificial substrate and may be completely or partially removed before or after a bonding process. An additional layer may be stacked after the removal of the substrate. For example, the second substrate 710 of the first cell region CELL1 may be removed before or after the bonding process of the peripheral circuit region PER1 and the first cell region CELL1, and then, an insulating layer covering a top surface of the common source line 720 or a conductive layer for connection may be formed. Likewise, the third substrate 810 of the second cell region CELL2 may be removed before or after the bonding process of the first cell region CELL1 and the second cell region CELL2, and then, the upper insulating layer 801 covering a top surface of the common source line 820 or a conductive layer for connection may be formed.

The memory cell array 102 of FIG. 2 may be included in the first cell region CELL1 or the second cell region CELL2, and other circuits included in the non-volatile memory device 10 may be included in the peripheral circuit region PER1.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been particularly shown and described with reference to implementations thereof. it will be understood that various changes in form and details may be made therein without departing from the spirit and scope of the following claims.

What is claimed is:

1. A memory system comprising:
   a memory device configured to
      read hard decision data from a memory cell array based on a hard read voltage,
      read first soft decision data from the memory cell array based on two or more first soft read voltages, the two or more first soft read voltages obtained based on the hard read voltage and a first voltage offset,
      generate a first compressed sub-segment based on encoding a position of a bit having a first value into a position value for each first soft decision sub-segment of a plurality of first soft decision sub-segments in the first soft decision data, and
      output first compressed data including a plurality of first compressed sub-segments; and
   a memory controller configured to
      receive the first compressed data,
      count the number of position values in each first compressed sub-segment of the plurality of first compressed sub-segments, and
      provide, to the memory device, a command based on the counted number, the command requesting a change of a voltage offset and a recompression operation.

2. The memory system of claim 1, wherein the memory device is configured to:
   change the voltage offset to a second voltage offset based on the command;
   read second soft decision data from the memory cell array based on the hard read voltage and the second voltage offset;
   generate a second compressed sub-segment based on encoding a position of a bit having the first value into the position value for each second soft decision sub-segment of a plurality of second soft decision sub-segments in the second soft decision data; and output second compressed data including a plurality of second compressed sub-segments.

3. The memory system of claim 2, wherein the second voltage offset is less than the first voltage offset.

4. The memory system of claim 1, wherein the memory controller is configured to:
count the number of first compressed sub-segments, in which the number of position values is equal to or greater than a first reference number, from the plurality of first compressed sub-segments; and
provide the command to the memory device based on the counted number of first compressed sub-segments being equal to or greater than a second reference value.

5. The memory system of claim 4, wherein the memory controller is configured to:
based on the counted number of first compressed sub-segments being less than the second reference value, generate the first soft decision data based on performing a decompression operation on the first compressed data; and
perform error correction on the hard decision data based on the first soft decision data being decompressed.

6. The memory system of claim 1, wherein the memory controller is configured to:
calculate a weighted sum based on the number of position values in each first compressed sub-segment of the plurality of first compressed sub-segments and a plurality of weights; and
provide the command to the memory device based on the weighted sum being equal to or greater than a third reference value.

7. The memory system of claim 1, wherein the memory controller is configured to:
receive, from the memory device, the hard decision data;
based on the number of changes of the voltage offset, obtain soft decision data based on performing decompression on compressed data received from the memory device; and
perform error correction on the hard decision data based on the soft decision data.

8. The memory system of claim 1, wherein the memory controller is configured to:
count the number of first compressed sub-segments, in which the number of position values is equal to or greater than a first reference number, from the plurality of first compressed sub-segments;
based on the counted number of first compressed sub-segments being equal to or greater than a second reference value, obtain soft decision data based on performing decompression on the first compressed data;
obtain a plurality of log-likelihood ratio (LLR) values for the hard decision data and the soft decision data based on an LLR mapping table; and
adjust an LLR value corresponding to a bit having a second value in the soft decision data.

9. A method of operating a memory controller, the method comprising:
providing a read command to a memory device;
receiving, from the memory device, hard decision data that is read based on a hard read voltage;
receiving first compressed data, the first compressed data including a plurality of first compressed sub-segments respectively corresponding to a plurality of first soft decision sub-segments, the plurality of first soft decision sub-segments included in first soft decision data that is read based on a plurality of first soft read voltages, the plurality of first soft read voltages obtained based on the hard read voltage and a voltage offset;
based on the number of position values of bits each having a first value in each first soft decision sub-segment of the plurality of first soft decision sub-segments, providing, to the memory device, a command, the command requesting a change of the voltage offset, the position values being included in each first compressed sub-segment of the plurality of first compressed sub-segments;
receiving, from the memory device, second compressed data of second soft decision data that is read based on a plurality of second soft read voltages, the plurality of second soft read voltages obtained based on the hard read voltage and the changed voltage offset;
obtaining the second soft decision data based on performing a decompression operation on the second compressed data; and
performing error correction on the hard decision data based on the second soft decision data.

10. The method of claim 9, wherein the providing of the command to the memory device comprises:
counting the number of first compressed sub-segments, in which the number of position values is equal to or greater than a first reference number, from the plurality of first compressed sub-segments;
providing the command to the memory device based on the counted number of first compressed sub-segments being equal to or greater than a second reference value; and
based on the counted number of first compressed sub-segments being less than the second reference value, obtaining the first soft decision data based on performing a decompression operation on the first compressed data, and performing error correction on the hard decision data based on the first soft decision data.

11. The method of claim 9, wherein the providing of the command to the memory device comprises:
calculating a weighted sum based on the number of position values in each first compressed sub-segment of the plurality of first compressed sub-segments and a plurality of weights;
providing the command to the memory device based on the weighted sum being equal to or greater than a third reference value; and
based on the weighted sum being less than the third reference value, obtaining the first soft decision data based on performing a decompression operation on the first compressed data, and performing error correction on the hard decision data based on the first soft decision data.

12. The method of claim 9, wherein the performing of the error correction on the hard decision data based on the second soft decision data comprises:
obtaining a plurality of log-likelihood ratio (LLR) values for the hard decision data and the second soft decision data based on an LLR mapping table; and
adjusting an LLR value corresponding to a bit having a second value in the second soft decision data.

13. The method of claim 9, wherein the number of position values of bits each having the first value in the second compressed data is less than the number of position values of bits each having the first value in the first compressed data.

14. The method of claim 9, wherein the obtaining of the second soft decision data based on performing the decompression operation on the second compressed data comprises:

for each second compressed sub-segment of a plurality of second compressed sub-segments in the second compressed data, generating a soft decision sub-segment based on including a bit having the first value in each position of a plurality of positions, the plurality of positions respectively indicated by a plurality of position values included in each second compressed sub-segment of the plurality of second compressed sub-segments; and generating the second soft decision data based on a plurality of soft decision sub-segments that are generated.

15. The method of claim 9, wherein the plurality of first compressed sub-segments have the same size.

16. A memory controller comprising:

a memory interface configured to receive, from a memory device, hard decision data and first compressed data, the hard decision data being read based on a hard read voltage, and the first compressed data including a plurality of first compressed sub-segments respectively corresponding to a plurality of first soft decision sub-segments of first soft decision data, the first soft decision data being read based on a plurality of first soft read voltages, the plurality of first soft read voltages obtained based on the hard read voltage and a voltage offset; and an error correction circuit configured to output a signal based on the number of position values of bits each having a first value in each first soft decision sub-segment of the plurality of first soft decision sub-segments, the signal requesting a change of the voltage offset, the position values being included in each first compressed sub-segment of the plurality of first compressed sub-segments.

17. The memory controller of claim 16, wherein the memory interface is configured to:

provide, to the memory device, a command, the command requesting the change of the voltage offset; and receive, from the memory device, second compressed data of second soft decision data that is read based on a plurality of second soft read voltages, the plurality of second soft read voltages obtained based on the hard read voltage and the changed voltage offset, and wherein the error correction circuit is configured to:

obtain the second soft decision data based on performing a decompression operation on the second compressed data; and perform error correction on the hard decision data based on the second soft decision data.

18. The memory controller of claim 17, wherein the number of position values of bits each having the first value in the second compressed data is less than the number of position values of bits each having the first value in the first compressed data.

19. The memory controller of claim 16, wherein the error correction circuit is configured to:

count the number of first compressed sub-segments, in which the number of position values is equal to or greater than a first reference number, from the plurality of first compressed sub-segments; and based on the counted number of first compressed sub-segments being less than a second reference value, obtain the first soft decision data based on performing a decompression operation on the first compressed data, and perform error correction on the hard decision data based on the first soft decision data.

20. The memory controller of claim 19, wherein the memory interface is configured to provide, to the memory device, a command based on the counted number of first compressed sub-segments being equal to or greater than the second reference value, the command requesting the change of the voltage offset.

* * * * *